US010685364B2

(12) United States Patent
Perelmutov et al.

(10) Patent No.: US 10,685,364 B2
(45) Date of Patent: Jun. 16, 2020

(54) METHOD AND APPARATUS FOR CAUSING A RECOMMENDATION OF A POINT OF INTEREST

(71) Applicant: HERE GLOBAL B.V., Veldhoven (NL)

(72) Inventors: Timur Perelmutov, Naperville, IL (US); Robert Camp, Winfield, IL (US); Toby Tennent, Chicago, IL (US); Gavril Giurgiu, Chicago, IL (US); Mark Pundurs, Des Plaines, IL (US); Justin Spelbrink, Sunnyvale, CA (US); Leon Stenneth, Chicago, IL (US); Dereje Befecadu, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 814 days.

(21) Appl. No.: 14/192,600

(22) Filed: Feb. 27, 2014

(65) Prior Publication Data
US 2015/0242868 A1    Aug. 27, 2015

(51) Int. Cl.
*G06Q 30/02* (2012.01)
*G01C 21/36* (2006.01)

(52) U.S. Cl.
CPC ..... *G06Q 30/0205* (2013.01); *G01C 21/3679* (2013.01)

(58) Field of Classification Search
CPC ............. G06Q 30/0206; G06Q 30/026; G06Q 30/025; G06Q 30/0205
See application file for complete search history.

(56) References Cited

U.S. PATENT DOCUMENTS 7,764,231 B1 * 7/2010 Karr .................. G01S 1/026
342/457
8,958,822 B2 * 2/2015 Liang .................. H04W 4/02
340/988

(Continued)

FOREIGN PATENT DOCUMENTS

| CN | 103098552 A | 7/2013 |
| CN | 103198552 A | 7/2013 |
| DE | 10 2010 022 707 A1 | 12/2011 |

OTHER PUBLICATIONS

Zhang et al., "Sensing the Pulse of Urban Refueling Behavior", UbiComp '13, Sep. 8-12, 2013, 10 pages.

*Primary Examiner* — Pan G Choy
(74) *Attorney, Agent, or Firm* — Ditthavong & Steiner, P.C.

(57) ABSTRACT

An approach is provided for determining at least one distribution of a plurality of current values for at least one dynamic content parameter associated with a plurality of points of interest within a predetermined proximity to at least one target point of interest. The approach involves determining at least one distribution mean and at least one distribution standard deviation for the at least one distribution of the plurality of current values. The approach also involves determining at least one set of historical values for the at least one dynamic content parameter for the at least one target point of interest. The approach further involves determining at least one estimated current value for the at least one dynamic content parameter associated with the at least one target point of interest based, at least in part, on the at least one set of historical values, the at least one distribution mean, and the at least one distribution standard deviation.

20 Claims, 27 Drawing Sheets

(56) References Cited

U.S. PATENT DOCUMENTS

| | | | | |
|---|---|---|---|---|
| 8,994,591 B2* | 3/2015 | Dupray | ................ | G01C 21/206 |
| | | | | 342/457 |
| 2005/0073443 A1* | 4/2005 | Sheha | .................... | G01C 21/36 |
| | | | | 340/995.1 |
| 2008/0313013 A1 | 12/2008 | Fell et al. | | |
| 2009/0292783 A1* | 11/2009 | Burke | .................... | G06Q 10/10 |
| | | | | 709/206 |
| 2009/0319178 A1* | 12/2009 | Khosravy | .......... | G06Q 30/0241 |
| | | | | 701/408 |
| 2010/0056183 A1* | 3/2010 | Oh | ...................... | H04L 12/1818 |
| | | | | 455/456.3 |
| 2010/0138151 A1* | 6/2010 | Jang | .................. | G01C 21/3476 |
| | | | | 701/533 |
| 2011/0046879 A1 | 2/2011 | Celli et al. | | |
| 2011/0130959 A1* | 6/2011 | Hwang | ............. | G01C 21/3614 |
| | | | | 701/533 |
| 2011/0313648 A1* | 12/2011 | Newson | ................. | G01C 21/30 |
| | | | | 701/447 |
| 2013/0096966 A1* | 4/2013 | Barnes, Jr. | ......... | G06Q 30/0267 |
| | | | | 705/5 |
| 2013/0262479 A1* | 10/2013 | Liang | ................ | G06F 16/24578 |
| | | | | 707/748 |
| 2014/0123179 A1* | 5/2014 | Wang | .................... | G06F 40/137 |
| | | | | 725/37 |
| 2014/0156411 A1* | 6/2014 | Murgai | ............. | G06Q 30/0269 |
| | | | | 705/14.58 |
| 2014/0279190 A1* | 9/2014 | Severinghaus | .... | G06Q 30/0631 |
| | | | | 705/26.7 |
| 2015/0204685 A1* | 7/2015 | Gearhart | ............. | G06F 3/04847 |
| | | | | 701/533 |
| 2015/0253141 A1* | 9/2015 | Kesting | ................. | G01C 21/32 |
| | | | | 701/409 |

* cited by examiner

FIG. 11

1101 — FUEL CONTENT

FOR EACH PETROL STATION
• FOR EACH DAY OF THE WEEK:

1103 — AVERAGE CITY GPI, A PERCENTILE RANK AT THE CITY LEVEL OVER THE LAST <X> WEEKS

1105 — CITY GPI VARIANCE, MEASURING VARIATION OF THE CITY GPI INDEX OVER THE LAST <X> WEEKS

1107 — AVERAGE COUNTRY GPI, A PERCENTILE RANK AT THE COUNTRY LEVEL OVER THE LAST <X> WEEKS

1109 — COUNTRY GPI VARIANCE, MEASURING VARIATION OF THE COUNTRY GPI INDEX OVER THE LAST <X> WEEKS

1111 — AVERAGE CONTINENTAL GPI, A PERCENTILE RANK AT THE CONTINENT LEVEL OVER THE LAST <X> WEEKS

1113 — CONTINENTAL GPI VARIANCE, MEASURING VARIATION OF THE CONTINENTAL GPI INDEX OVER THE LAST <X> WEEKS

1115 — *PRICE INFORMATION PER TYPE (OPTIONAL)*

1117 — RICH CONTENT STATIC INFORMATION (ALTERNATE TYPE OF FUEL, AMENITIES, OPENING HOURS, ETC...)

1119 — FUEL SERVICE API

1121 — STANDARD FUEL SEARCH:
- FILTER BY FUEL TYPE
- RELEVANCE BY DISTANCE (RADIUS, ON ROUTE)
- RELEVANCE BY PRICE
- DETAILED INFO (ADDRESS, PHONE, PRICE CATEGORY, OPENING HOURS,...)

1121 — FUEL ON A TRIP SEARCH:
- FILTER BY FUEL TYPE
- FILTER BY ROUTE CORRIDOR
- RELEVANCE BY PRICE
- RELEVANCE BY DISTANCE TO PLANED ROUTE
- DETAILED INFO (ADDRESS, PHONE, OPENING HOURS,...)

1123 — Find preferred fuel station:
- Filter by fuel type
- Filter by polygon based on reference points set by user (2 to 4 places I visit every week)
- Relevance by Price
- Detailed info (address, phone, opening hours,...)
- When is the best time /day to pump fuel over the course of a whole week

FIG. 13

| DAY | Z VALUE FOR 046A1E46-B180-102D-A695-00304891A58C 1301 | Z VALUE FOR 8A332946-BA74-102B-B5EF-00304891A58C 1303 | Z VALUE FOR 853A5C2A-BA74-102B-B5EF-00304891A58C 1305 | Z VALUE FOR 8475C040-BA74-102B-B5EF-00304891A58C 1307 | Z VALUE FOR 7DA4261C-BA74-102B-B5EF-00304891A58C 1309 |
|---|---|---|---|---|---|
| DAY 1 | -0.455849 | 0.698966 | 0.314028 | 0.698966 | 0.698966 |
| DAY 2 | 0.0325976 | 0.724469 | -0.313336 | 0.724469 | 0.0325976 |
| DAY 3 | 0.150204 | 0.150204 | -0.187011 | 0.824638 | -0.524226 |
| DAY 4 | -0.0532356 | 0.885281 | 0.572444 | 0.885281 | 0.572444 |
| DAY 5 | -2.07711 | 0.759454 | 0.759454 | 0.759454 | 0.759454 |
| DAY 6 | -0.631454 | 0.751767 | 0.751767 | 0.751767 | 0.751767 |
| DAY 7 | -0.738631 | 0.381037 | 0.00781462 | 0.754264 | -0.365408 |
| DAY 8 | -0.198366 | 0.144617 | -0.198366 | 0.487603 | 0.144617 |
| DAY 9 | -0.290904 | 0.783175 | 0.783175 | 0.783175 | 0.0671208 |
| DAY 10 | 0.0557597 | 0.710478 | -1.9084 | 0.0557597 | -0.598962 |

… # METHOD AND APPARATUS FOR CAUSING A RECOMMENDATION OF A POINT OF INTEREST

BACKGROUND

Service providers and device manufacturers (e.g., wireless, cellular, etc.) are continually challenged to estimate the missing dynamic information for at least one point of interest (POI). If a POI neglects to report their real time content information, service providers finds it difficult to reflect the real status of the POI based, at least in part, on the historical information of the POI, and the real time content information of the other proximate POIs. Needless to mention, real time content information associated with one or more POI is important in making an informed decision before deciding on a particular POI. As a result, service providers face significant technical challenges in making an accurate estimation of the missing dynamic information for the at least one POI.

Some Example Embodiments

Therefore, there is a need for an approach for determining missing dynamic content for at least one target POI by processing plurality of current values for at least one dynamic content parameter associated with a plurality of POIs.

According to one embodiment, a method comprises determining at least one distribution of a plurality of current values for at least one dynamic content parameter associated with a plurality of points of interest within a predetermined proximity to at least one target point of interest. The method also comprises determining at least one distribution mean and at least one distribution standard deviation for the at least one distribution of the plurality of current values. The method further comprises determining at least one set of historical values for the at least one dynamic content parameter for the at least one target point of interest. The method also comprises determining at least one estimated current value for the at least one dynamic content parameter associated with the at least one target point of interest based, at least in part, on the at least one set of historical values, the at least one distribution mean, and the at least one distribution standard deviation.

According to another embodiment, an apparatus comprises at least one processor, and at least one memory including computer program code for one or more computer programs, the at least one memory and the computer program code configured to, with the at least one processor, cause, at least in part, the apparatus to determine at least one distribution of a plurality of current values for at least one dynamic content parameter associated with a plurality of points of interest within a predetermined proximity to at least one target point of interest. The apparatus is also caused to determine at least one distribution mean and at least one distribution standard deviation for the at least one distribution of the plurality of current values. The apparatus is further caused to determine at least one set of historical values for the at least one dynamic content parameter for the at least one target point of interest. The apparatus is also caused to determine at least one estimated current value for the at least one dynamic content parameter associated with the at least one target point of interest based, at least in part, on the at least one set of historical values, the at least one distribution mean, and the at least one distribution standard deviation.

According to another embodiment, a computer-readable storage medium carries one or more sequences of one or more instructions which, when executed by one or more processors, cause, at least in part, an apparatus to determine at least one distribution of a plurality of current values for at least one dynamic content parameter associated with a plurality of points of interest within a predetermined proximity to at least one target point of interest. The apparatus is also caused to determine at least one distribution mean and at least one distribution standard deviation for the at least one distribution of the plurality of current values. The apparatus is further caused to determine at least one set of historical values for the at least one dynamic content parameter for the at least one target point of interest. The apparatus is also caused to determine at least one estimated current value for the at least one dynamic content parameter associated with the at least one target point of interest based, at least in part, on the at least one set of historical values, the at least one distribution mean, and the at least one distribution standard deviation.

According to another embodiment, an apparatus comprises means for determining at least one distribution of a plurality of current values for at least one dynamic content parameter associated with a plurality of points of interest within a predetermined proximity to at least one target point of interest. The apparatus also comprises means for determining at least one distribution mean and at least one distribution standard deviation for the at least one distribution of the plurality of current values. The apparatus further comprises means for determining at least one set of historical values for the at least one dynamic content parameter for the at least one target point of interest. The apparatus also comprises means for determining at least one estimated current value for the at least one dynamic content parameter associated with the at least one target point of interest based, at least in part, on the at least one set of historical values, the at least one distribution mean, and the at least one distribution standard deviation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 11 is a diagram that represents one or more features of the recommendation platform 109, according to one example embodiment;

FIG. 13 is a diagram that represents a scenario wherein Z-values are computed for different fuel stations, according to one example embodiment;

DESCRIPTION OF SOME EMBODIMENTS

Examples of a method, apparatus, and computer program for determining missing dynamic content for at least one target POI by processing plurality of current values for at least one dynamic content parameter associated with a plurality of POIs are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
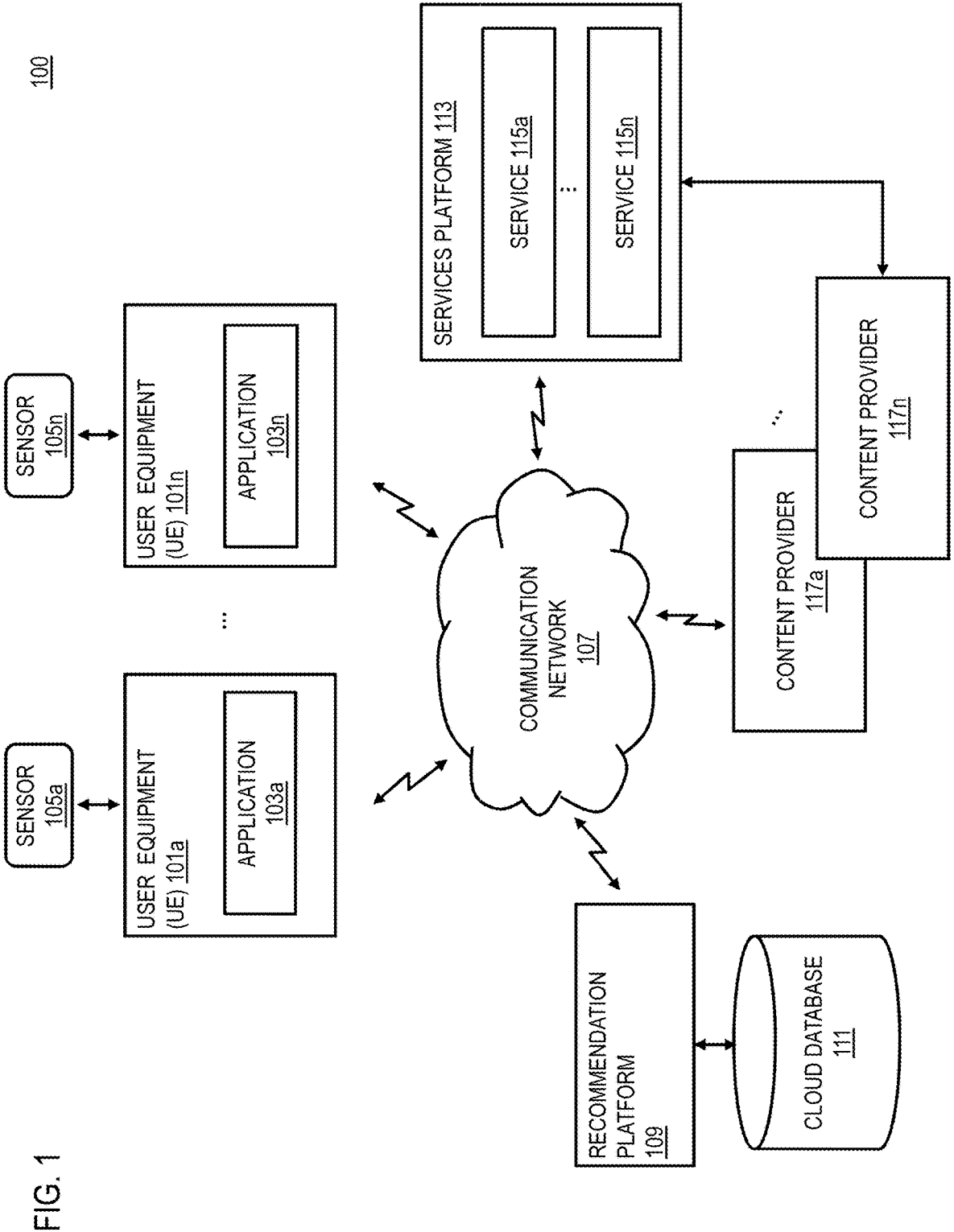
FIG. 1 is a diagram of a system capable of determining missing dynamic content for at least one target POI by processing plurality of current values for at least one dynamic content parameter associated with a plurality of POIs, according to one embodiment.

FIG. 1 is a diagram of a system capable of determining missing dynamic content for at least one target POI by processing plurality of current values for at least one dynamic content parameter associated with a plurality of POIs, according to one embodiment. At present, there is a difficulty in estimating dynamic content for the at least one POI with missing dynamic content. Further, it is a challenge to compute price indexes based, at least in part, on the estimates, actual values, queries from one or more users, or a combination thereof. In addition, there is difficulty in determining when to compute the price indexes and how to display a recommendation for the at least one POI in the navigation system. In one scenario, the existing solutions may route at least one user to the cheapest fuel station but cannot estimate the missing prices and/or the queue length information, for example, a user may prefer a more expensive fuel station with shorter queues as compared to a cheaper fuel station with longer queues.

To address this problem, a system 100 of FIG. 1 introduces the capability to determine missing dynamic content for at least one target POI by processing plurality of current values for at least one dynamic content parameter associated with a plurality of POIs. As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a recommendation platform 109 via the communication network 107, whereby the recommendation platform 109 performs one or more functions associated with determining missing dynamic content for at least one target POI by processing plurality of current values for at least one dynamic content parameter associated with a plurality of POIs.

In one embodiment, the system 100 performs a location and a cloud based approach where multiple POIs may report static and dynamic contents to the recommendation platform 109. The static content may include location information, contextual information, historical information (e.g. fuel types, fuel prices one month ago, queue length for each fuel pumps, etc.). The dynamic content may include current information (e.g. current fuel pump queue length, current fuel types, current fuel prices, etc.). There can be constant communication between the recommendation platform 109, and the one or more vehicles, the one or more POIs. For example, the one or more vehicles may report their current information (e.g. location information, current fuel level, destination, etc.) to the recommendation platform 109. Then, the system 100 may cause a matching of the at least one vehicle's location to the address location inaccuracies and align the at least one vehicle with the road's geometry. In one example embodiment, the recommendation platform 109 may receive information on fuel prices from one or more fuel stations, at least one driver using or is close by the fuel station, or a combination thereof. The one or more fuel stations may submit the fuel prices directly to the recommendation platform 109 as soon as the fuel prices are available. Alternatively, the at least one driver may be at a fuel station and may report the prices he/she witnesses, and when more drivers reports similar price information, the confidence of the report also increases. In another embodiment, the static information such as name, location, and address of the at least one POI may be validated for consistency using geocoding or reverse geocoding schemes. For example, given the static location of the fuel station, system 100 may reverse geocode to produce a high level street address. This derived address is compared to the given address using distance measures, for example, Edit or Haversine distance. If the derived and given information are reasonably close, then the location and address are determined to be consistent. The address may also be a forward geocode to derive a location. Given the derived location, system 100 may compute the Euclidean distance between the derived and given location for consistency.

In one embodiment, the system 100 may have coverage and real time dynamic information for one or more POIs in a particular location for such cloud based recommendation service. In one scenario, some POIs may not regularly report the dynamic information, wherein the system 100 may estimate the dynamic information for the target POI based, at least in part, on historic information, current information, or a combination thereof. In one example embodiment, the system 100 may determine missing dynamic information for at least one target fuel station by determining historic fuel prices and/or historic queue length information for the target fuel station, current fuel prices and/or current queue length information of the nearby fuel stations that submitted their dynamic content, or a combination thereof. Such estimation of dynamic content may be based on a weighted average between the historical information and the real-time dynamic content reported by POIs those stations in the region. In one scenario, the estimation process may also be based on Kalman filter model or simpler models that are based on Z values estimation scheme.

In one embodiment, the system 100 may determine nearby POIs based on the static contents, wherein the location information, the contextual information (for e.g. name of the POI) may be archived in the cloud database 111. As discussed, whenever POI does not provide its dynamic content to the recommendation platform 109, the system 100 may estimate the dynamic content based, at least in part, on historical information and the currently reported dynamic content information of the nearby POIs. In one scenario, dynamic contents may be reported at different frequencies, for example, fuel prices may be reported once per day while queue length information may be reported continuously. In one example embodiment, if multiple drivers visit at least one fuel station whose dynamic content is missing, the driver may provide the dynamic content for the fuel station which can then be used to make accurate estimations as well as improve the confidence of the report. In one scenario, after such estimations, the one or more POIs at a particular location may have an updated dynamic content. Then, the system 100 may compute a Fuel Price Index (FPI) for the at least one POI. An FPI is a ranking of nearby POIs, for example, ranking of one or more fuel stations based on fuel types. Such computation may be based, at least in part, on the computed estimates, the spatial query from the at least one driver, or a combination thereof. The spatial query may be based, at least in part, on a bounding box, a collection of bounding boxes for a corridor, proximity, or a combination thereof. In one embodiment, the FPI may be calculated based, at least in part, on the request for the POI that falls within the user's spatial query (proximity, bounding box, or collection of bounding boxes for a corridor search).

In one embodiment, the range of queries coming from the vehicle for POI related information may be initiated either manually by the at least one driver or it may be automatically issued by the at least one vehicle. In one scenario, the at least one vehicle may query for a fuel station due to current observed fuel levels, whereby system 100 may provide an index based, at least in part, on the actual fuel prices reported for the current 24 hour period or from the estimated fuel prices for fuel stations that did not report a price. These actual and estimated values may be provided by dynamic content management in a daily basis and may be delivered via a file server to the cloud services. In addition, a percentile rank may be calculated per user request by the cloud services as the FPI for each fuel station using the formula below:

$$FPI_i = ((Cl + 0.5 * F_i) * 100) / N$$

Figure 15:
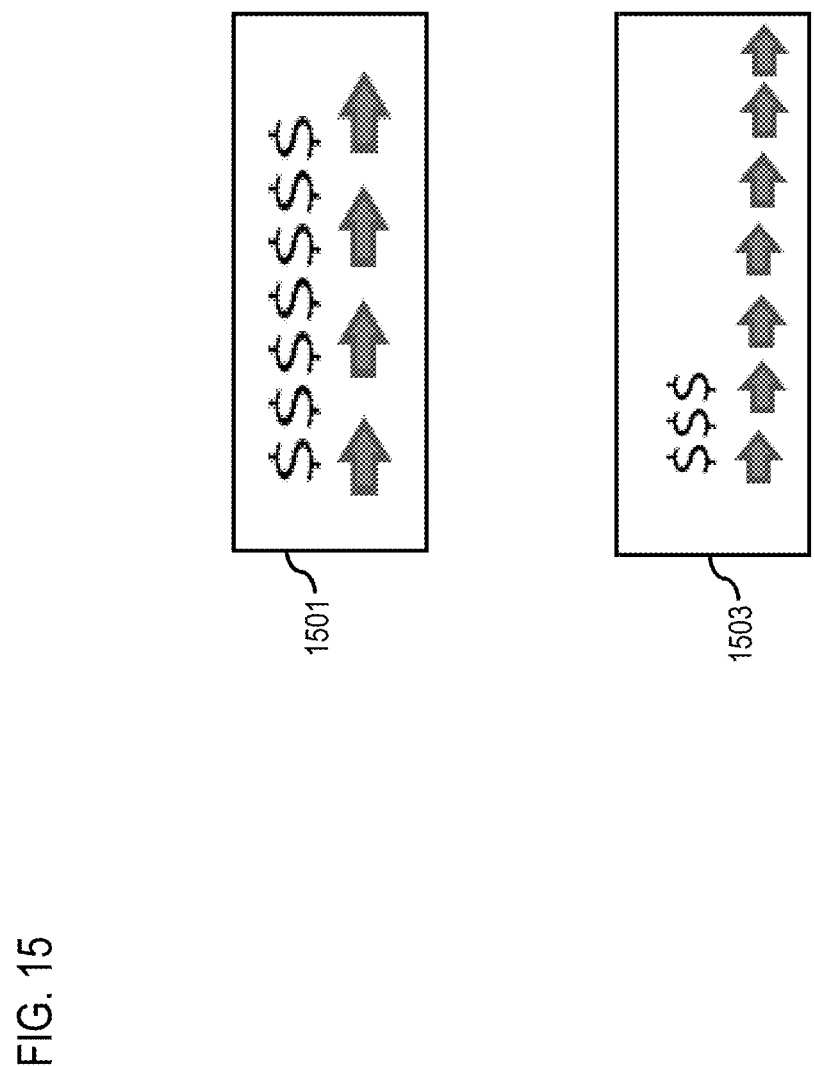
FIG. 15 is a diagram that represents a fuel station recommendation sent to the at least one navigation system, according to one example embodiment.

Where:
  $FPI_i$ is the fuel price index for station I;
  N is the number of the fuel stations that are being ranked;
  i is the index of the fuel station;
  $F_i$ is the frequency of the Price $P_i$ (number of the stations that have exactly the same fuel price as $P_i$, including the current station);
  Cl be the number of the fuel stations where price for given fuel type is lower than $P_i$;

The dynamic content referred to as the current fuel type queue length provides an idea of the current length of the queue for a particular gas type and is not used to compute the FPI. Similarly, the queue length may be estimated as fuel prices when the queue length data is missing for a given fuel station and is based on history and nearby fuel stations. However, in some implementation queue length data may be reported along with FPI interpreted data to the at least one navigation system. The fuel station queue length may influence a driver's decision to visit a fuel station even though the fuel price may be low. In one embodiment, system 100 may not provide fuel price information to the navigation systems. Instead, for fuel stations that are within a certain range, the system 100 may report FPI as a number in 0 to 100 range. The system 100 may also provide likely range of price difference from the lowest price expected in the given result set. The final output of the system 100 for visualization purposes can be an encoded scheme, the same is represented in FIG. 15.

In addition to the FPI, the system 100 may calculate two other values for each station and fuel type combination. One is the difference from base which is calculated by subtracting the estimated/reported price and the least expensive fuel price returned in the query. The other is a margin of error if the price is estimated. In one embodiment, the margin of error may be derived from measuring how well past prices for at least one fuel station have been estimated. Whenever a fuel price is reported, the estimation calculation is performed and a comparison is made. The absolute value of the difference is averaged over all reported fuel prices and/or fuel types for the at least one station, and is rounded to the nearest whole number to be presented as a '+/−' margin of error. Alternatively, to simplify the use of the margin of error would be to calculate a single margin of error for the entire dataset and return it to the client in the response with all the FPI and the difference from base. This reduces the confusion on why some estimates have considerably more or less margin of error than others when the same algorithm is used for all. Finally, if for a given area, there are not enough actual reported prices for the current period to estimate a station's price, no estimate will be created. The data delivered to the recommendation platform 109 for that day may not contain any data for that station. This would be determined on a fuel type basis. Thus, a station's data for a given day may have an estimated price for one type, an actual price for another type and no data for a third type. In one scenario, when a fuel type is missing in the daily data provided to the recommendation platform 109, no FPI can be calculated. The static data may contain the station but no index may be displayed.

A hypothetical margin of error is provided that illustrates how the FPI, difference from base and the margin of error values might appear for various use cases. In one scenario, when the query returns only a single station, a neutral index of 50 is calculated. The Difference from base will be zero since the only data point is the base:

| Station ID/Type | Price | CI | Fi | FPI | Diff | Error |
| --- | --- | --- | --- | --- | --- | --- |
| 123456/22 | $3.99 | 0 | 1 | 50 | $0.00 | +/−0.03 |

$FPI_0 = ((0 + 0.5 * 1) * 100)/1 \rightarrow (.5 * 100)/1 \rightarrow 50$

In another scenario, when the query returns two stations with different values, the indexes calculated are 25 for the lower price and 75 for the higher price regardless of how far apart the prices differ. The Difference from base may reflect the spread. Further, in this example, the price for 123998/22 was a reported price and the price for 123999/22 was estimated. A reported price may not have a margin of error calculated;

| Station ID/Type | Price | CI | Fi | FPI | Diff | Error |
| --- | --- | --- | --- | --- | --- | --- |
| 123999/22 | $3.99 | 1 | 1 | 75 | $0.08 | +/−$0.04 |
| 123998/22 | $3.91 | 0 | 1 | 25 | $0.00 | +/−$0.00 |

$FPI_0 = ((0 + 0.5 * 1) * 100)/2 \rightarrow (.5 * 100)/2 \rightarrow 25$
$FPI_1 = ((1 + 0.5 * 1) * 100)/2 \rightarrow (1.5 * 100)/2 \rightarrow 75$ In a further scenario, when the query returns two stations with similar values, the index calculated for both is 50. Each has a Difference from base of zero. Again, in this example 123998/22 was a reported price and 123999/22 was an estimated price with a hypothetical margin of error.

| Station ID/Type | Price | CI | Fi | FPI | Diff | Error |
| --- | --- | --- | --- | --- | --- | --- |
| 123999/22 | $3.91 | 0 | 2 | 50 | $0.00 | +/−$0.04 |
| 123998/22 | $3.91 | 0 | 2 | 50 | $0.00 | +/−$0.00 |

$FPI_0 = ((0 + 0.5 * 2) * 100)/2 \rightarrow (1.0 * 100)/2 \rightarrow 50$

In one scenario, when many fuel stations are returned, the indexes calculated are distributed based on the rank and the frequency. The difference from the base is shown in the table and hypothetical margin of error values are given:

| Station ID/Type | Price | CI | Fi | FPI | Diff | Error |
| --- | --- | --- | --- | --- | --- | --- |
| 123999/22 | $4.02 | 9 | 1 | 95 | $0.11 | +/−$0.00 |
| 123998/22 | $4.01 | 8 | 1 | 85 | $0.10 | +/−$0.04 |
| 123997/22 | $3.99 | 7 | 1 | 75 | $0.08 | +/−$0.07 |
| 123996/22 | $3.97 | 4 | 3 | 55 | $0.06 | +/−$0.02 |
| 123995/22 | $3.97 | 4 | 3 | 55 | $0.06 | +/−$0.03 |
| 123994/22 | $3.97 | 4 | 3 | 55 | $0.06 | +/−$0.05 |
| 123993/22 | $3.95 | 3 | 1 | 35 | $0.04 | +/−$0.00 |
| 123992/22 | $3.92 | 1 | 2 | 30 | $0.01 | +/−$0.02 |
| 123991/22 | $3.92 | 1 | 2 | 30 | $0.01 | +/−$0.00 |
| 123990/22 | $3.91 | 0 | 1 | 5 | $0.00 | +/−$0.00 |

$FPI_0 = ((0 + 0.5 * 1) * 100)/10 \rightarrow (.5 * 100)/10 \rightarrow 5$
$FPI_1 = ((1 + 0.5 * 2) * 100)/10 \rightarrow (3.0 * 100)/10 \rightarrow 30$
$FPI_3 = ((3 + 0.5 * 1) * 100)/10 \rightarrow (3.5 * 100)/10 \rightarrow 35$
$FPI_4 = ((4 + 0.5 * 3) * 100)/10 \rightarrow (5.5 * 100)/10 \rightarrow 55$
$FPI_7 = ((7 + 0.5 * 1) * 100)/10 \rightarrow (7.5 * 100)/10 \rightarrow 75$
$FPI_8 = ((8 + 0.5 * 1) * 100)/10 \rightarrow (8.5 * 100)/10 \rightarrow 85$
$FPI_9 = ((9 + 0.5 * 1) * 100)/10 \rightarrow (9.5 * 100)/10 \rightarrow 95$ By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or WiFi connection either through the inbuilt communication equipment or from the UE 101 associated with the vehicles. The applications 103 may assist in conveying sensor information via the communication network 107.

By way of example, the applications 103 may be any type of application that is executable at the UE 101, such as content provisioning services, location-based service applications, navigation applications, camera/imaging applications, media player applications, social networking applications, calendar applications, and the like. In one embodiment, one of the applications 103 at the UE 101 may act as a client for the recommendation platform 109 and may perform one or more functions associated with the functions of the recommendation platform 109 by interacting with the recommendation platform 109 over the communication network 107.

By way of example, the sensors 105 may be any type of sensor. In certain embodiments, the sensors 105 may include, for example, a global positioning sensor for gathering location data, a network detection sensor for detecting wireless signals or network data, a camera/imaging sensor for gathering image data, an audio recorder for gathering audio data, and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, Li-Fi, near field communication etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the recommendation platform 109 may be a platform with multiple interconnected components for automotive cloud services. The recommendation platform 109 may include multiple servers, intelligent networking devices, computing devices, components and corresponding software for determining missing dynamic content for at least one target POI by processing plurality of current values for at least one dynamic content parameter associated with a plurality of POIs. In addition, it is noted that the recommendation platform 109 may be a separate entity of the system 100, a part of the one or more services 115 of the services platform 113, or included within the UE 101 (e.g., as part of the applications 103).

In one embodiment, the recommendation platform 109 may determine that the fuel prices in a geographic area around the at least one fuel station follows a particular distribution pattern, wherein over the time the shape of the distribution remains about the same and the position of the particular fuel station in the historic price value distribution is close to the position of current price in current fuel price distribution. For a given fuel station S, the recommendation platform 109 may compute that the historical price for fuel F had a Z-value Z and percentile P. Let I be a set of all fuel stations in the given geographic area, and the number of historical fuel prices for the fuel stations in set I with values Xi. Let $\sigma$ be a standard deviation and $\mu$ be a mean value for normal distribution for the prices Xi. The value Xs is the historical price for fuel station S (S∈I), then Z-value (standard score):

$$Z_s = (X_s - \mu)/\sigma \quad (1)$$

If the standard score is known, then price at fuel station S can be reconstructed using:

$$Xs = \mu + Zs*\sigma \quad (2)$$

The recommendation platform 109 may determine reliable current prices for subset of the fuel stations K ⊂ I, and may compute the current normal distribution parameters for the subset, (i.e. $\mu_k$ and $\sigma_k$). Assuming that the station S Z-value (its standard score, its percentile) do not change, the estimate price $EX_s$ could be computed using:

$$EXs = \mu k + Zs*\sigma k. \quad (3)$$

In one embodiment, the recommendation platform 109 may implement the algorithm herein below for estimating the dynamic content of a POI that did not submit their dynamic content report. In one scenario, the algorithm may compute the fuel price estimate by using the historical and the current price information for fuel at nearby fuel stations:

1. Find m closest fuel stations to the given station S up to a maximum radius (i.e. 10 km). For example m could be 100.

2. Find historical Z values for this fuel station for last n days, when the historical price for this fuel station is known. Initially n could be 7. Let these values be called zi.

3. Find the average of the Z value over N days the Zs=(Σzi)/n

4. Let $\mu k$ and $\sigma k$ be the mean and standard deviation for the current or latest known fuel prices out of the set of m closest station, then we compute estimate as EXs=$\mu k$+Zs*$\sigma k$.

In one embodiment, for queue length dynamic content estimation for at least one fuel station with missing information, the above calculation may be modified. The dynamic contents are reported at different frequencies, for example, the fuel prices can be reported once per day while the queue length can be reported on a continuous basis (e.g. every 15 minutes).

In addition to the fuel price estimate, the recommendation platform 109 may compute fuel price estimate confidence range. The result of the fuel price estimate may be presented as follows:

Fuel price estimate for fuel station S is $3.99+/−10 cents per gallon.

The confidence level may be based on the accuracy of the historical estimates versus the actual data, computed as the data becomes available. For example, the recommendation platform 109 computes an estimate for today morning, and receives the actual value in the afternoon, the difference may be stored in the cloud database 111. The recommendation platform 109 may use this difference in the future computation, and the similar differences from the past to compute the estimate range. The recommendation platform 109 may only consider the past n differences to compute the confidence and may not go back to months or years.

In one embodiment, the recommendation platform 109 may include or be associated with at least one cloud database 111, which may exist in whole or in part within the recommendation platform 109. The cloud database 111 may include one or more indexed data point clouds associated with the recommendation platform 109, including, content information for one or more POIs, time stamp information, location information, geo-direction information etc. In one embodiment, the cloud database 111 may store real-time and/or historical dynamic contents for one or more POIs. In one scenario, the recommendation platform 109 may determine dynamic and/or static contents for one or more POIs within a proximity threshold from the cloud database 111 as such contents are archived in the cloud database 111. In another embodiment, the recommendation platform 109 may receive content information from various sources, for example, the sensors 105, the one or more UE 101's associated with the at least one POI and/or the at least one vehicle, third-party content providers, databases, etc., and may store the received content information on the cloud database 111. The cloud database 111 may include identifiers to the UE 101's as well as associated information. Further, the information may be any multiple types of information that can provide means for aiding in the content provisioning process.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the recommendation platform 109 and the content providers 117 to supplement or aid in the processing of the content information.

By way of example, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the recommendation platform 109 with travel related information for the one or more vehicles.

The content providers 117 may provide content to the UE 101, the recommendation platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining missing dynamic content for at least one target POI. In one embodiment, the content providers 117 may also store content associated with the UE 101, the recommendation platform 109, and the services 115 of the services platform 113. In another embodiment, the content providers 117 may manage access to a central repository of data, and offer a consistent, standard interface to data.

By way of example, the UE 101, the recommendation platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
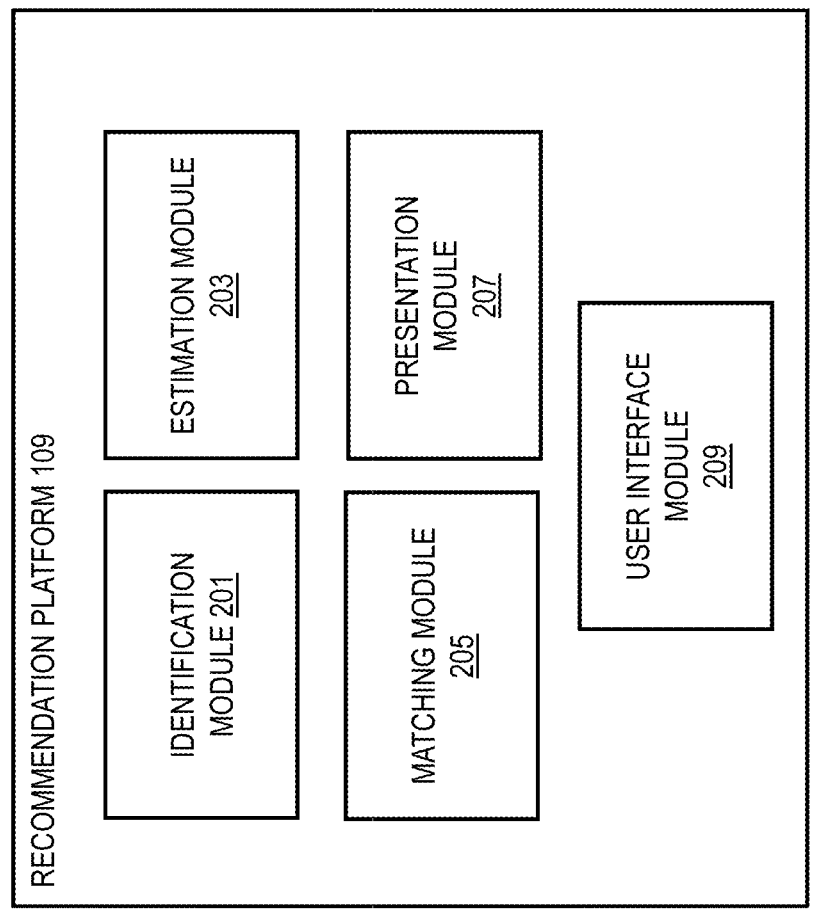
FIG. 2 is a diagram of the components of the recommendation platform 109, according to one embodiment.

FIG. 2 is a diagram of the components of the recommendation platform 109, according to one embodiment. By way of example, the recommendation platform 109 includes one or more components for determining missing dynamic content for at least one target POI by processing plurality of current values for at least one dynamic content parameter associated with a plurality of POIs. It is contemplated that the functions of these components may be combined in one or more components or performed by other components of equivalent functionality. In this embodiment, the recommendation platform 109 includes an identification module 201, an estimation module 203, a matching module 205, a presentation module 207 and a user interface module 209.

In one embodiment, the identification module 201 may identify geographical extent for one or more queries. In another embodiment, the identification module 201 may identify real time dynamic information for the at least one POI within the determined geographic region, wherein the identification module 201 may pinpoint missing dynamic information for the at least one POI. In a further embodiment, the identification module 201 may identify the one or more POIs, the one or more vehicles, the one or more UE 101's associated with the at least one vehicle, the one or more UE 101 associated with the at least one POI, or a combination thereof. Then, the identification module 201 may correlate the real time dynamic content information from the cloud database 111 to their respective source, for example, the UE 101 associated with the at least one POI and/or at least one vehicle.

In one embodiment, the estimation module 203 may estimates dynamic information for one or more POIs. In one scenario, one or more POIs may fail to report real time content information, wherein the estimation module 203 may estimate their real time content based, at least in part, on the historical information, and the real time contents of neighboring POIs. For example, if a grocery store does not report pricing information and/or queue length information in real time, they are estimated by the estimation module 203. In another embodiment, the estimation module 203 may estimate the confidence level for one or more pricing information, wherein the confidence level is based on the accuracy of the historical estimates as compared to the actual contents. In a further embodiment, the estimation module 203 may estimate one or more data based on weighted average between historical information and the real-time dynamic content of proximate POIs.

In one embodiment, the matching module 205 causes a matching of location for one or more vehicles to determine inaccuracies in the GPS signal, if any. In one scenario, the recommendation platform 109 may receive static information, for example, location information for the at least one POI, whereby the identification module 201 may validate the location information via geocoding or reverse geocoding schemes. Subsequently, the matching module 205 causes a comparison of the location information for reliability purposes. In another embodiment, the matching module 205 may cause a comparison between an estimated historical value against an actual historical value associated with the at least one target point of interest for determining confidence range. In a further embodiment, the matching module 205 may cause a matching of pricing information to determine a margin of error, for example, whenever price for a particular commodity is reported, the estimation calculation is performed and a comparison is made. The matching module 205 may cause comparisons in real-time, periodically, based on a pre-determined schedule, based on demands from one or more users or a combination thereof.

In one embodiment, the presentation module 207 obtains a set of summary statistics from the other modules. Then, the presentation module 207 continues with generating a presentation corresponding to the request by displaying a recommendation for at least one POI in the at least one navigation system. In another embodiment, the presentation module 207 may provide a display of one or more signs in an encoded scheme, for example, the presentation module 207 may cause a display of a dollar sign indicating a price recommendation and an arrow sign indicating queue length information. In a further embodiment, the presentation module 207 causes a display of one or more smart data and/or graphs and/or charts for any dynamic content parameter for any POI, for example, grocery prices at certain grocery stores.

In one embodiment, the user interface module 209 enables presentation of a graphical user interface (GUI) for displaying map images with content information in connection to a selected destination. For example, the user interface module 209 executes a GUI application configured to provide users with content-based navigational services wherein one or more contents are placed on one or more display surfaces associated with one or more object surfaces depicted in at least one image. The user interface module 209 employs various application programming interfaces (APIs) or other function calls corresponding to the applications 103 of the UE 101, thus enabling the display of graphics primitives such as menus, buttons, data entry fields, etc., for generating the user interface elements. Still further, the user interface module 209 may be configured to operate in connection with augmented reality (AR) processing techniques, wherein various different applications, graphic elements and features may interact. For example, the user interface module 209 may coordinate the presentation of augmented reality map images in conjunction with content information for a given location or in response to a selected destination.

The above presented modules and components of the recommendation platform 109 can be implemented in hardware, firmware, software, or a combination thereof. Though depicted as a separate entity in FIG. 1, it is contemplated that the recommendation platform 109 may be implemented for direct operation by respective UE 101. As such, the recommendation platform 109 may generate direct signal inputs by way of the operating system of the UE 101 for interacting with the applications 103. In another embodiment, one or more of the modules 201-209 may be implemented for operation by respective UEs, as a recommendation platform 109, or combination thereof. Still further, the recommendation platform 109 may be integrated for direct operation with the services 115, such as in the form of a widget or applet, in accordance with an information and/or subscriber sharing arrangement. The various executions presented herein contemplate any and all arrangements and models.

Figure 3:
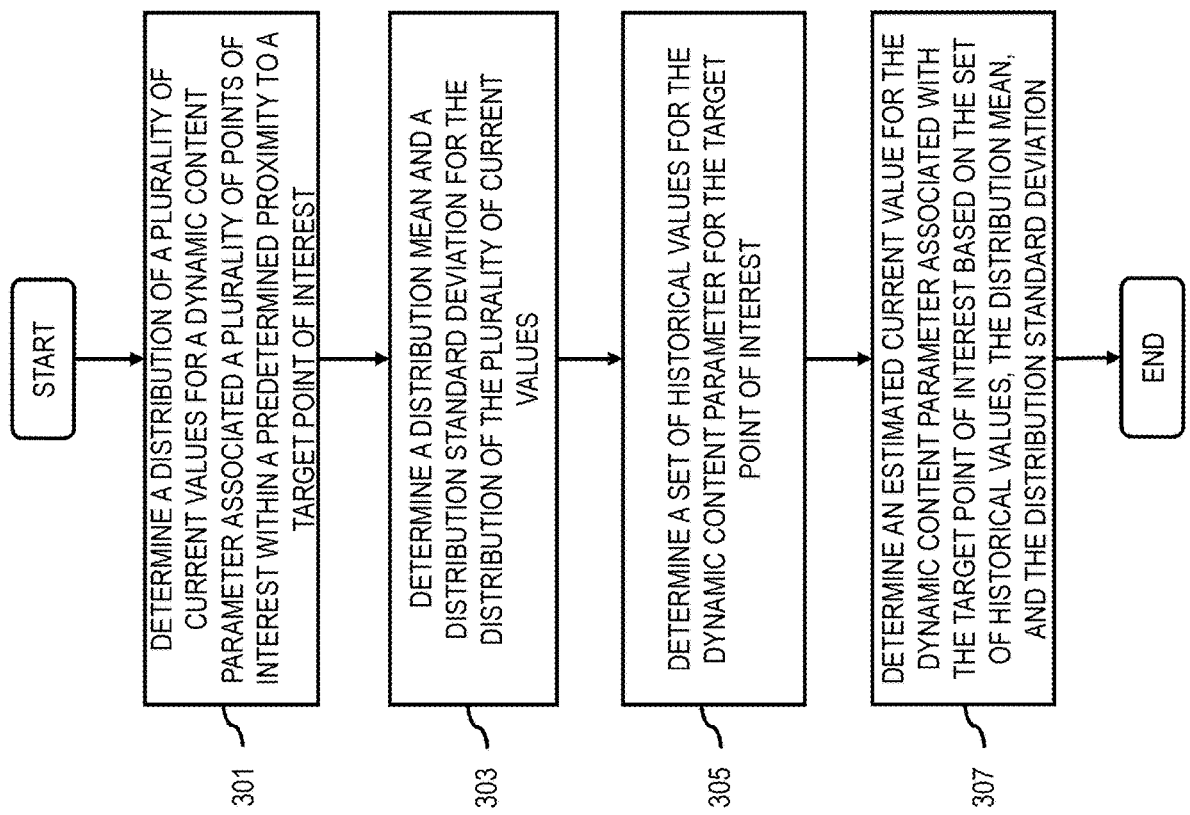
FIG. 3 is a flowchart of a process for determining missing dynamic content for at least one target POI by processing plurality of current values for at least one dynamic content parameter associated with a plurality of POIs, according to one embodiment.
Figure 17:
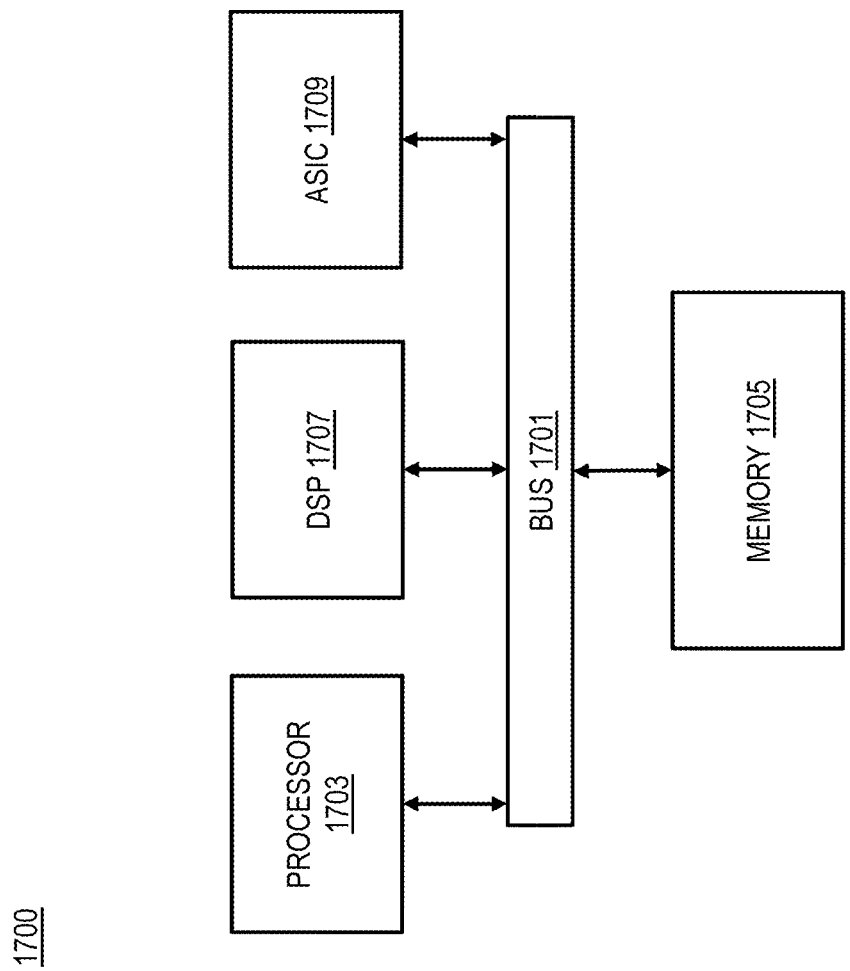
FIG. 17 is a diagram of a chip set that can be used to implement an embodiment of the invention.

FIG. 3 is a flowchart of a process for determining missing dynamic content for at least one target POI by processing plurality of current values for at least one dynamic content parameter associated with a plurality of POIs, according to one embodiment. In one embodiment, the recommendation platform 109 performs the process 300 and is implemented in, for instance, a chip set including a processor and a memory as shown in FIG. 17.

In step 301, the recommendation platform 109 determines at least one distribution of a plurality of current values for at least one dynamic content parameter associated a plurality of points of interest within a predetermined proximity to at least one target point of interest. In one embodiment, the plurality of points of interest and the at least one target point of interest include, at least in part, one or more fuel stations. In another embodiment, the at least one dynamic content parameter includes, at least in part, one or more fuel prices, one or more queue lengths, or a combination thereof. In one scenario, the recommendation platform 109 may estimate values for any dynamic content parameter for any POI, and not just for fuel pricing information and/or queue length information for the at least one fuel station. For example, the recommendation platform 109 may estimate grocery prices at a grocery store and/or clothing prices at a clothing store etc.

In step 303, the recommendation platform 109 determines at least one distribution mean and at least one distribution standard deviation for the at least one distribution of the plurality of current values. In one scenario, the recommendation platform 109 may compute historical pricing information and their percentile for one or more commodities associated with one or more POIs in a given geographic region. In case, the recommendation platform 109 is of determination that there are numerous historical pricing information for the one or more POIs, the recommendation platform 109 may determine a standard deviation and a mean value for normal distribution of pricing information.

In step 305, the recommendation platform 109 determines at least one set of historical values for the at least one dynamic content parameter for the at least one target point of interest. In one embodiment, the at least one set of historical values represents one or more known values for the at least one dynamic parameter collected from the at least one target point of interest over a predetermined prior time period.

In step 307, the recommendation platform 109 determines at least one estimated current value for the at least one dynamic content parameter associated with the at least one target point of interest based, at least in part, on the at least one set of historical values, the at least one distribution mean, and the at least one distribution standard deviation. In one scenario, the recommendation platform 109 may process historical information for at least one POI based, at least in part, on a determination that the dynamic content for the at least one POI is missing. For example, the recommendation platform 109 may process historical information on fuel types, fuel prices, queue length for fuel pumps, etc. In another scenario, the recommendation platform 109 may determine a mean value and a standard deviation for one or more POIs in the given geographic region to determine the position of the at least one POI in terms of historic price value distribution as compared to the current price distribution.

Figure 4:
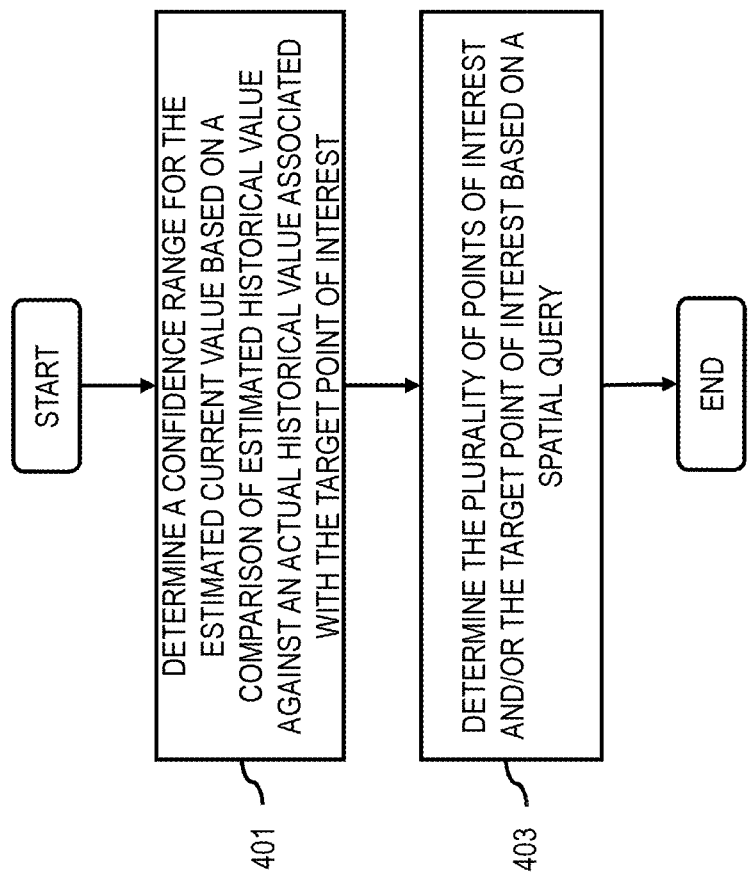
FIG. 4 is a flowchart of a process for determining confidence range and/or plurality of POIs and/or the target POI, according to one embodiment.

FIG. 4 is a flowchart of a process for determining confidence range and/or plurality of POIs and/or the target POI, according to one embodiment. In one embodiment, the recommendation platform 109 performs the process 400 and is implemented in, for instance, a chip set including a processor and a memory as shown in FIG. 17.

In step 401, the recommendation platform 109 determines at least one confidence range for the at least one estimated current value based, at least in part, on a comparison of at least one estimated historical value against at least one actual historical value associated with the at least one target point of interest. In one embodiment, the recommendation platform 109 may determine that there is an increase in the confidence level of the at least one reporting based, at least in part, on reporting of similar contents from one or more sources. In one scenario, the one or more customer visiting a grocery store with missing dynamic information may provide dynamic content for that grocery store. Such information may be used to make estimations more accurate and improve the confidence level. In another embodiment, the recommendation platform 109 may determine the confidence level based, at least in part, on the correctness of the historical estimates versus the actual data.

In step 403, the recommendation platform 109 determines the plurality of points of interest, the at least one target point of interest, or a combination thereof based, at least in part, on at least one spatial query. In one scenario, the at least one spatial query may be based on a bounding box, a collection of bounding boxes for a corridor, a proximity information, or a combination thereof. The recommendation platform 109 may calculate FPI for one or more POIs that fall within the at least one user's spatial query. In one scenario, the recommendation platform 109 may calculate FPI for at least one target vehicle and/or the at least one POI based, at least in part, on submission of a range or spatial query.

Figure 5:
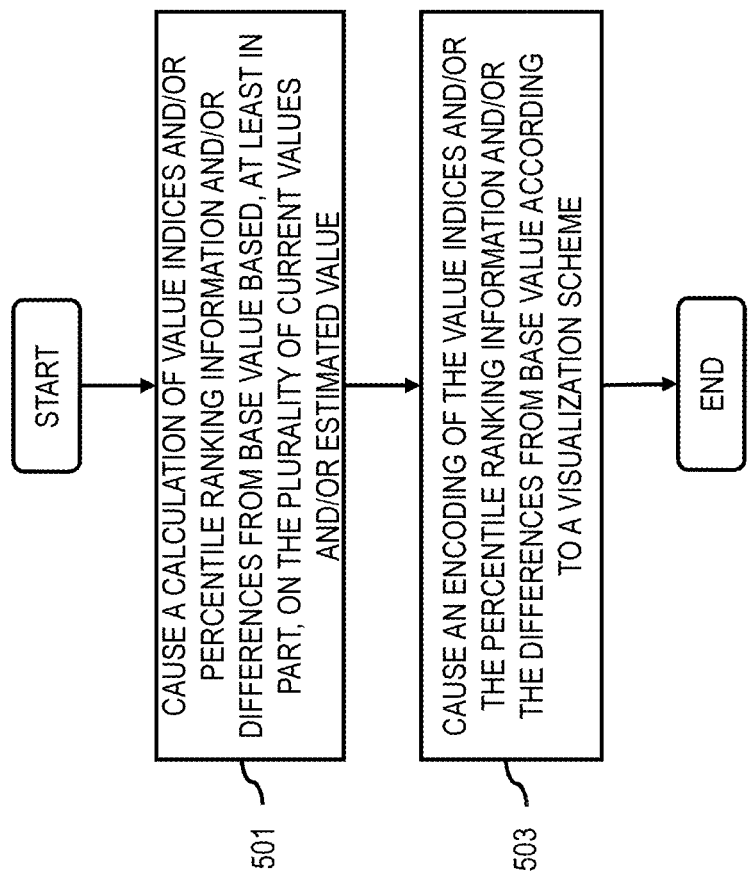
FIG. 5 is a flowchart of a process for causing, at least in part, a calculation and/or encoding of one or more value indices, percentile ranking information, one or more differences from at least one base value, or a combination thereof, according to one embodiment.

FIG. 5 is a flowchart of a process for causing, at least in part, a calculation and/or encoding of one or more value indices, percentile ranking information, one or more differences from at least one base value, or a combination thereof, according to one embodiment. In one embodiment, the recommendation platform 109 performs the process 500 and is implemented in, for instance, a chip set including a processor and a memory as shown in FIG. 17.

In step 501, the recommendation platform 109 causes, at least in part, a calculation of one or more value indices, percentile ranking information, one or more differences from at least one base value, or a combination thereof based, at least in part, on the plurality of current values, the at least one estimated value, or a combination thereof. In one scenario, the recommendation platform 109 may calculate percentile ranking for the at least one POI based, at least in part, on the FPI for the at least one POI, the index of the at least one POI, the number of POIs with pricing lower than the price index, the number of POIs with similar pricing information, the number of POIs that are being ranked, or a combination thereof. In another scenario, the recommendation platform 109 may subtract the estimated and/or reported pricing information with the least expensive pricing for at least one commodity that is returned in the query, to calculate the base.

In step 503, the recommendation platform 109 causes, at least in part, an encoding of the one or more value indices, the percentile ranking information, the one or more differences from at least one base value, or a combination thereof according to at least one visualization scheme. In one scenario, the recommendation platform 109 may implement dynamic content measures and signal schemes to interpret the data and present the final output in an encoded order, for example, a dollar signs may indicate the price recommendations, and the arrow signs may indicate the queue length for the at least one POI. A less number of dollar signs may signify lower index, and a less number of arrows may signify shorter the queues.

Figure 6:
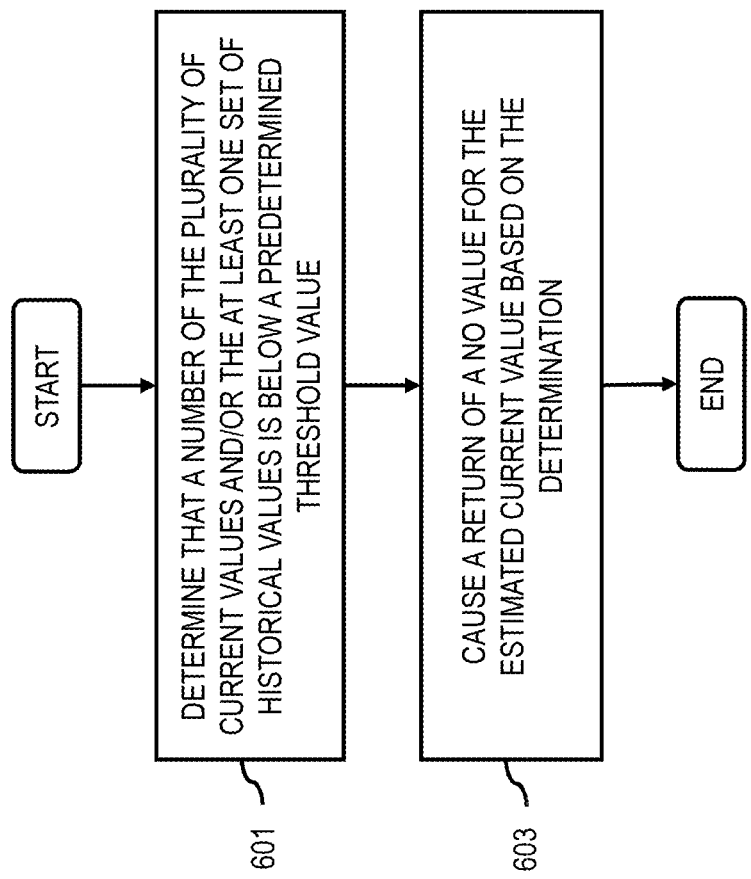
FIG. 6 is a flowchart of a process for determining whether plurality of current values and/or a set of historical values are below a predetermined threshold value, according to one embodiment.

FIG. 6 is a flowchart of a process for determining whether plurality of current values and/or a set of historical values are below a predetermined threshold value, according to one embodiment. In one embodiment, the recommendation platform 109 performs the process 600 and is implemented in, for instance, a chip set including a processor and a memory as shown in FIG. 17.

In step 601, the recommendation platform 109 determines that a number of the plurality of current values, the at least one set of historical values, or a combination thereof is below a predetermined threshold value. In one embodiment, the plurality of current values represent one or more current values collected at a current time, within a predetermined time window prior to the current time, or a combination thereof. In one scenario, the recommendation platform 109 may determine one or more information reported within the current 24 hour period as the actual pricing information for the at least one POI. Any information that is reported beyond the 24 hour time window may not deemed current information, whereupon the recommendation platform 109 may estimate one or more information.

In step 603, the recommendation platform 109 causes, at least in part, a return of a no value for the at least one estimated current value based, at least in part, on the determination. In one scenario, the recommendation platform 109 may compute an estimate for a shopping mall in the morning, and may receive the actual value in the afternoon, whereby the different between the estimated value and the actual value is stored in the cloud database 111. The recommendation platform 109 may use the difference, and the similar differences from the past to compute the estimate range in the future. In another scenario, when a query returns only a single POI, a neutral index may be calculated, wherein the difference from the base may be zero since the only data point is the base. In a further scenario, when a query returns two POIs with the same values (i.e. the reported price and the estimated price is matching), the index calculated may be similar, thus the difference from base is zero.

Figure 7:
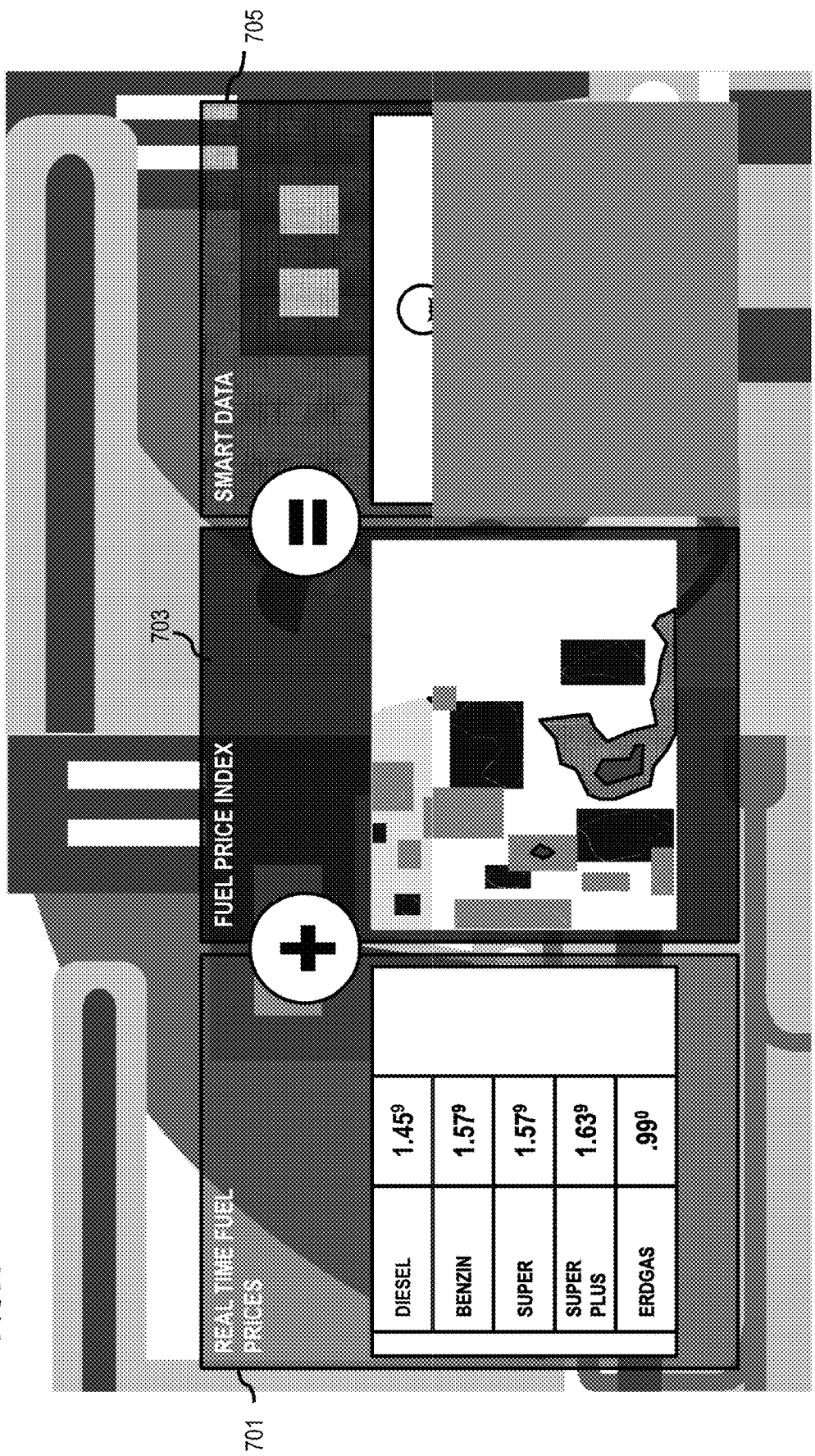
FIG. 7 is a user interface diagram that represents a scenario whereby at least one smart data is presented to the at least one UE 101, according to one example embodiment.

FIG. 7 is a user interface diagram that represents a scenario whereby at least one smart data is presented to the at least one UE 101, according to one example embodiment. In one scenario, the recommendation platform 109 may process the real time fuel price information [701] of one or more fuel stations within a close proximity from the at least one POI. If at least one fuel station fails to report real time content, the recommendation platform 109 may estimate the real time content for the at least one fuel station based, at least in part, on the history and real time content of one or more neighboring fuel stations. Then, the recommendation platform 109 may compute a fuel price index (FPI) [703] based, at least in part, on the real time fuel price information of the at least one fuel station. The FPI evaluates real time pricing for one or more fuel stations and compares the prices to historic price levels to derive a relative price. Subsequently, the recommendation platform 109 may endorse at least one fuel stations based, at least in part, on the FPI [705].

Figure 8:
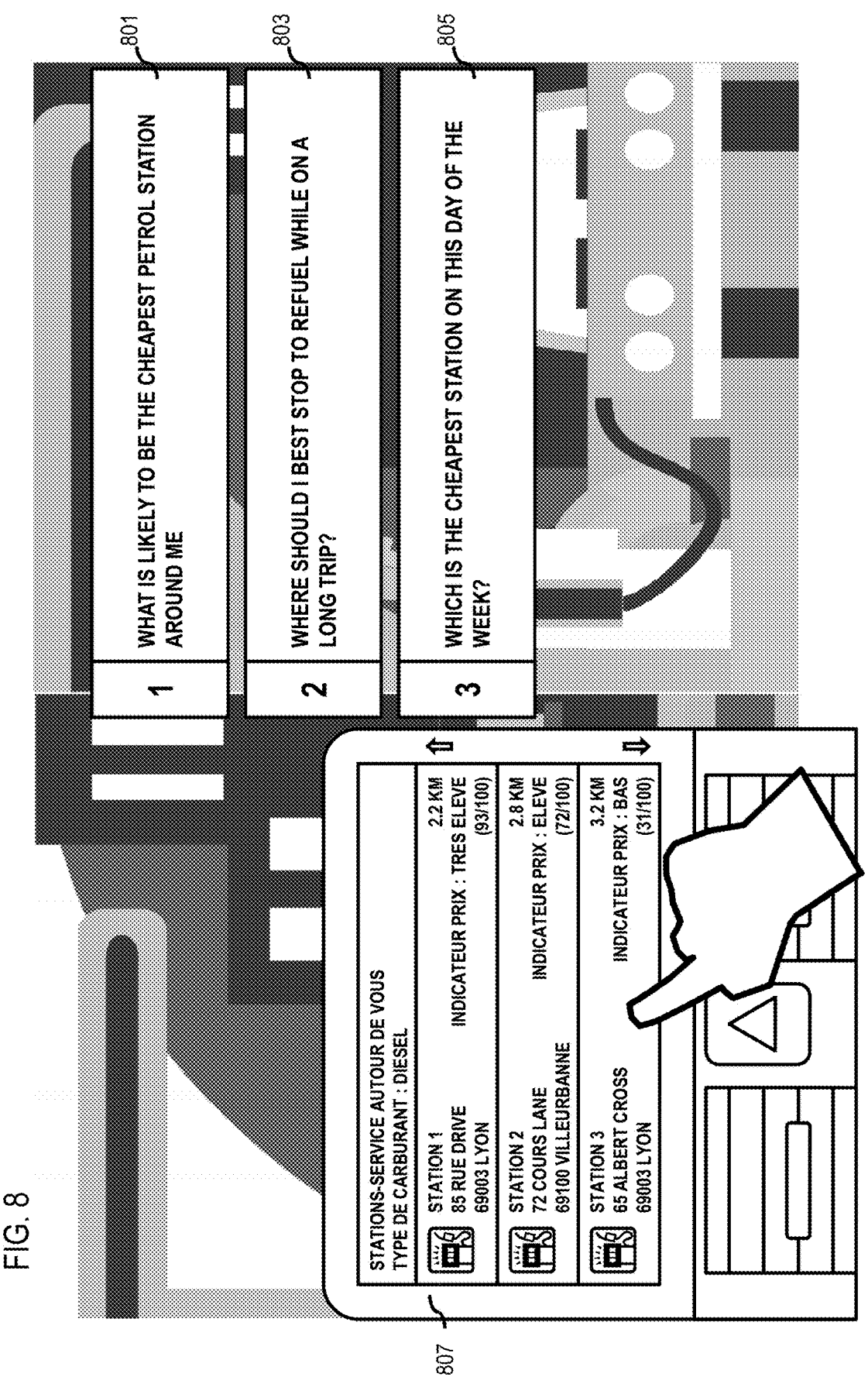
FIG. 8 is a user interface diagram that represents a scenario wherein the at least one user is ensured that he/she fuels at the right moment for the right price, according to one example embodiment.

FIG. 8 is a user interface diagram that represents a scenario wherein the at least one user is ensured that he/she fuels at the right moment for the right price, according to one example embodiment. In one scenario, at least one user may query the recommendation platform 109 with questions that ensures right fuel price at the right moment, for example, the at least one user may ask (i) what is likely to be the cheapest petrol station around me?[801]; (ii) where should I best stop to refuel while on a long trip?[803]; and (iii) which is the cheapest station on this day of the week?[805]. Then, the recommendation platform 109 may calculate FPI for the one or more fuel stations that falls within the at least one user's spatial query. In one example embodiment, the FPI may be a price score for at least one fuel station's fuel prices, wherein the score may range from 1 to 100 indicating relative price levels. The relative price level is represented in the table herein below:

| | |
|---|---|
| $$$$$ | 75 + Index value (most expensive) |
| $$$$ | 60-75 |
| $$$ | 40-60 |
| $$ | 25-40 |
| $ | Under 25 (least expensive) |

In one scenario, the price score may be defined for each day of the week and for each type of fuel. Subsequently, the recommendation platform 109 may provide a presentation of a list of fuel station [807] to the at least one user based, at least in part, on the FPI.

Figure 9:
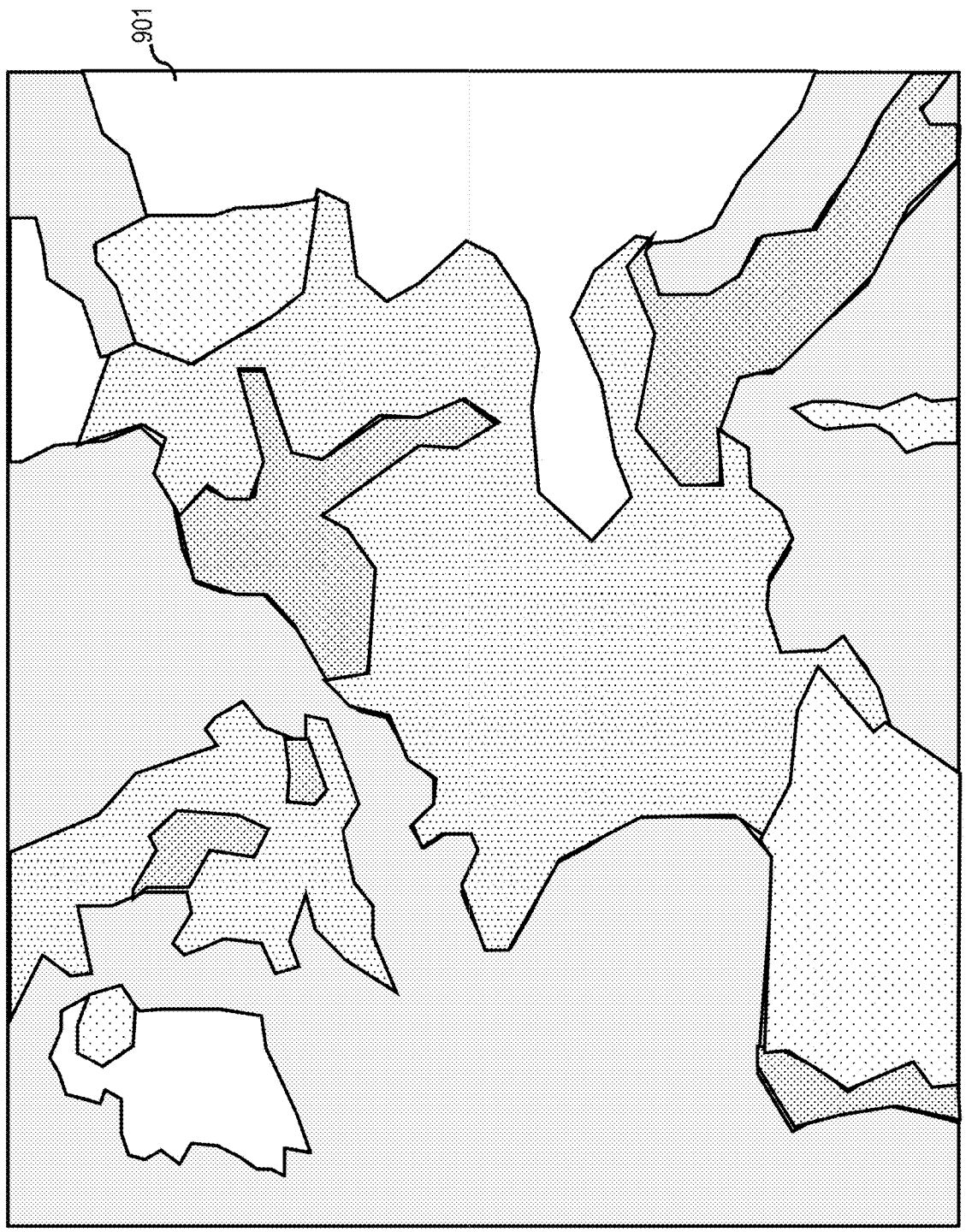
FIG. 9 is a diagram that represents a ranking of one or more fuel stations in a wide level, according to one example embodiment.

FIG. 9 is a diagram that represents a ranking of one or more fuel stations in a wide level, according to one example embodiment. In one scenario, the recommendation platform 109 may provide a country level and/or a large range level (500 km, 1000 km) ranking of fuel stations [901] to provide index for users crossing a border along the trip. In one scenario, the recommendation platform 109 may archive gas price data for one or more fuel stations in a large range level. Then, the historic archive of gas price data for one or more fuel stations may be refreshed with their respective real time price information, whenever available. Subsequently, the recommendation platform 109 may rank one or more fuel stations statistically at different geographic levels to cover either (i) LOCAL—City/region comparison, or (ii) MACRO—Country wide comparison.

Figure 10:
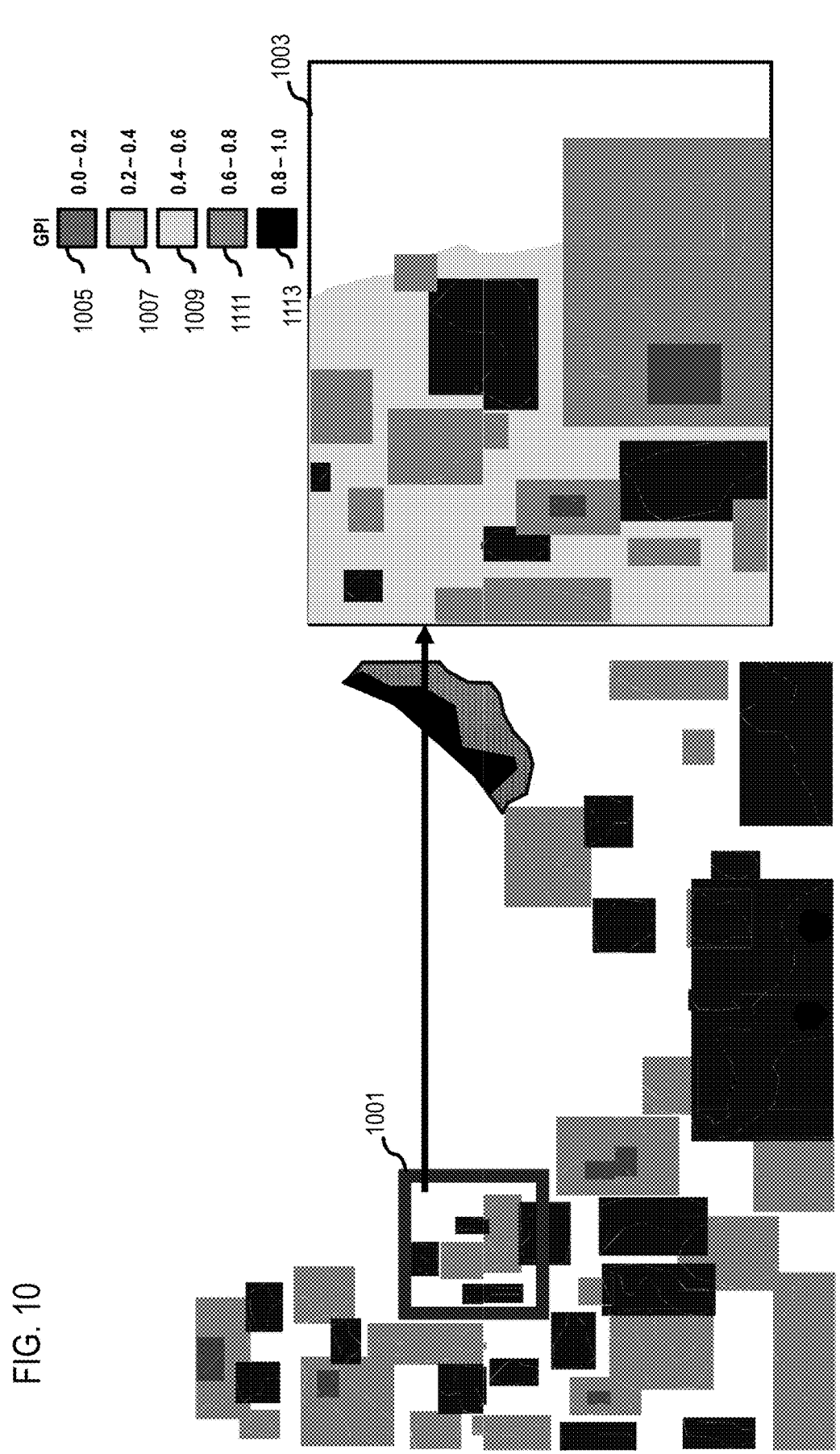
FIG. 10 is a diagram that represents a city based level modelling, according to one example embodiment.
Figure 12A:
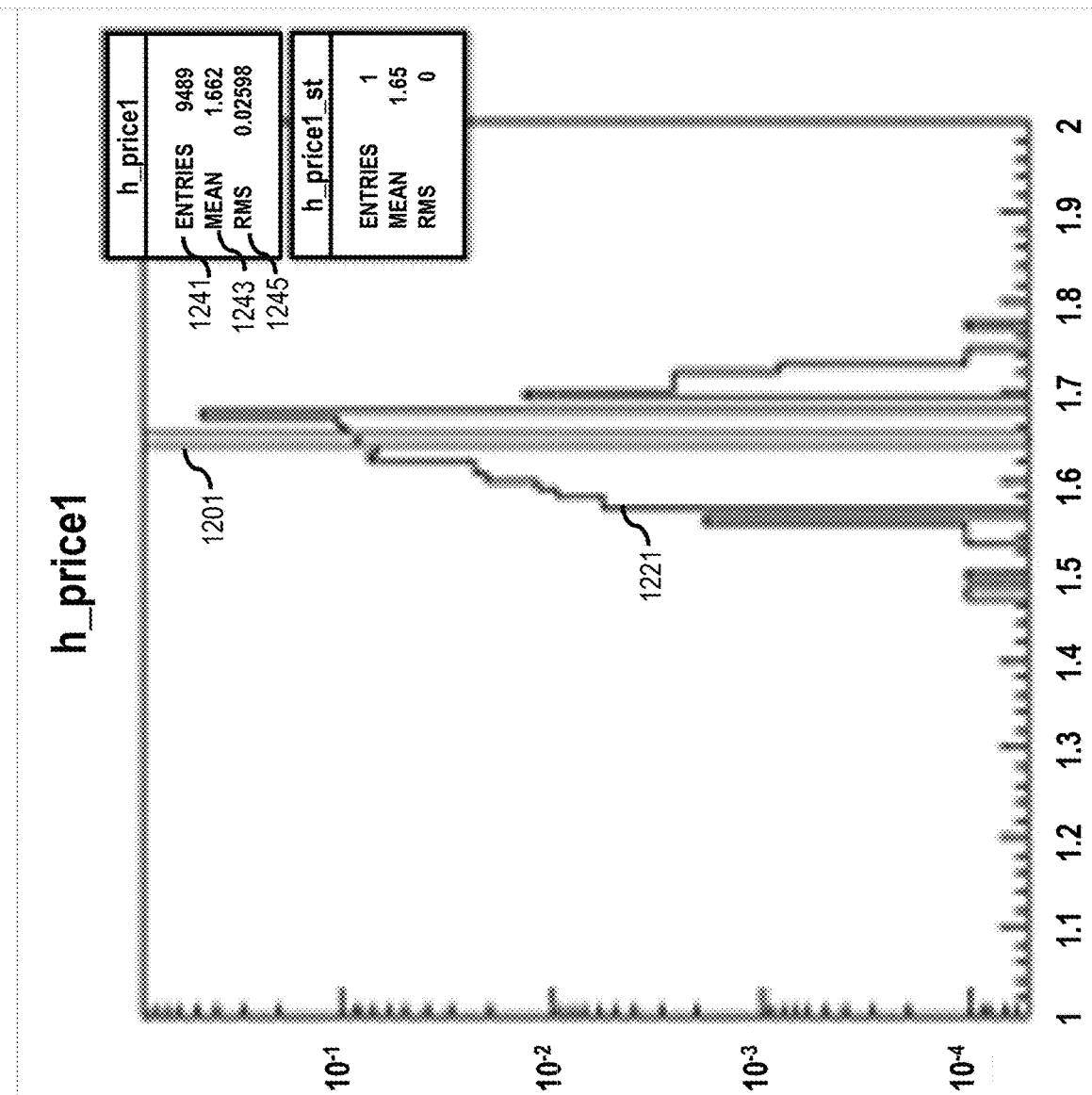
FIGS. 12A-12J are diagrams of the fuel price distribution and the Z-value computation, according example embodiments.
Figure 12:
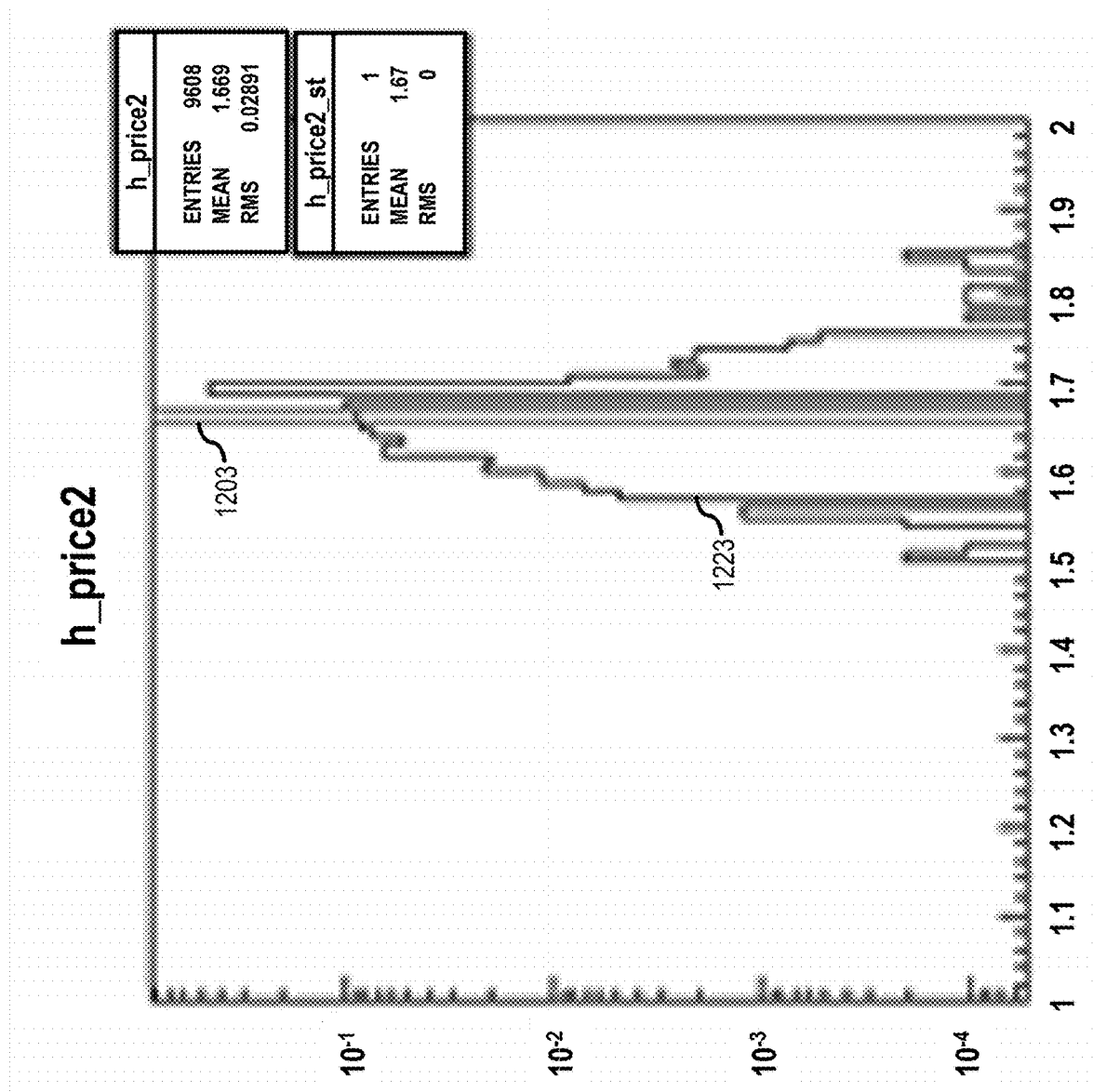
Figure 12:
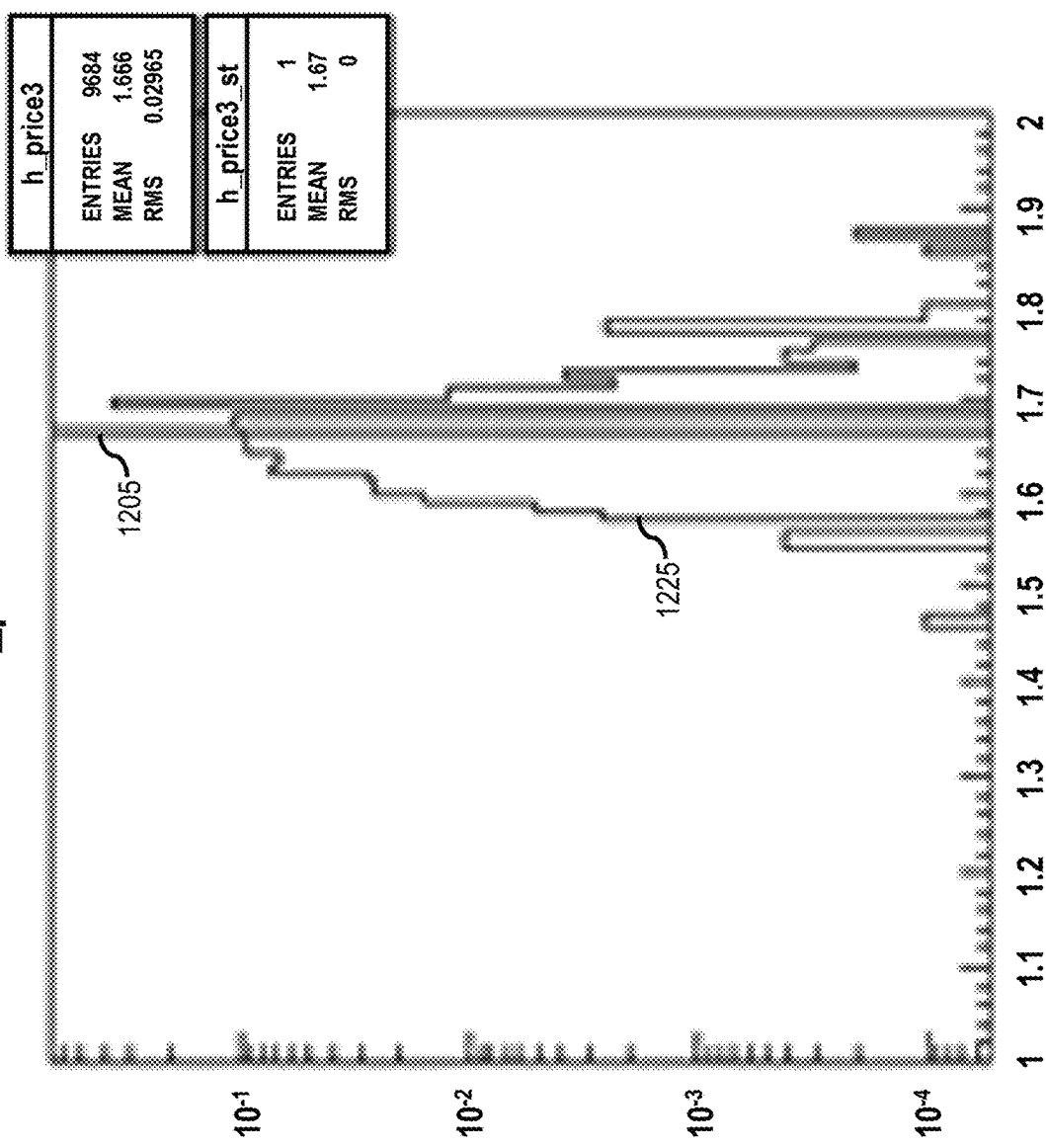
Figure 12:
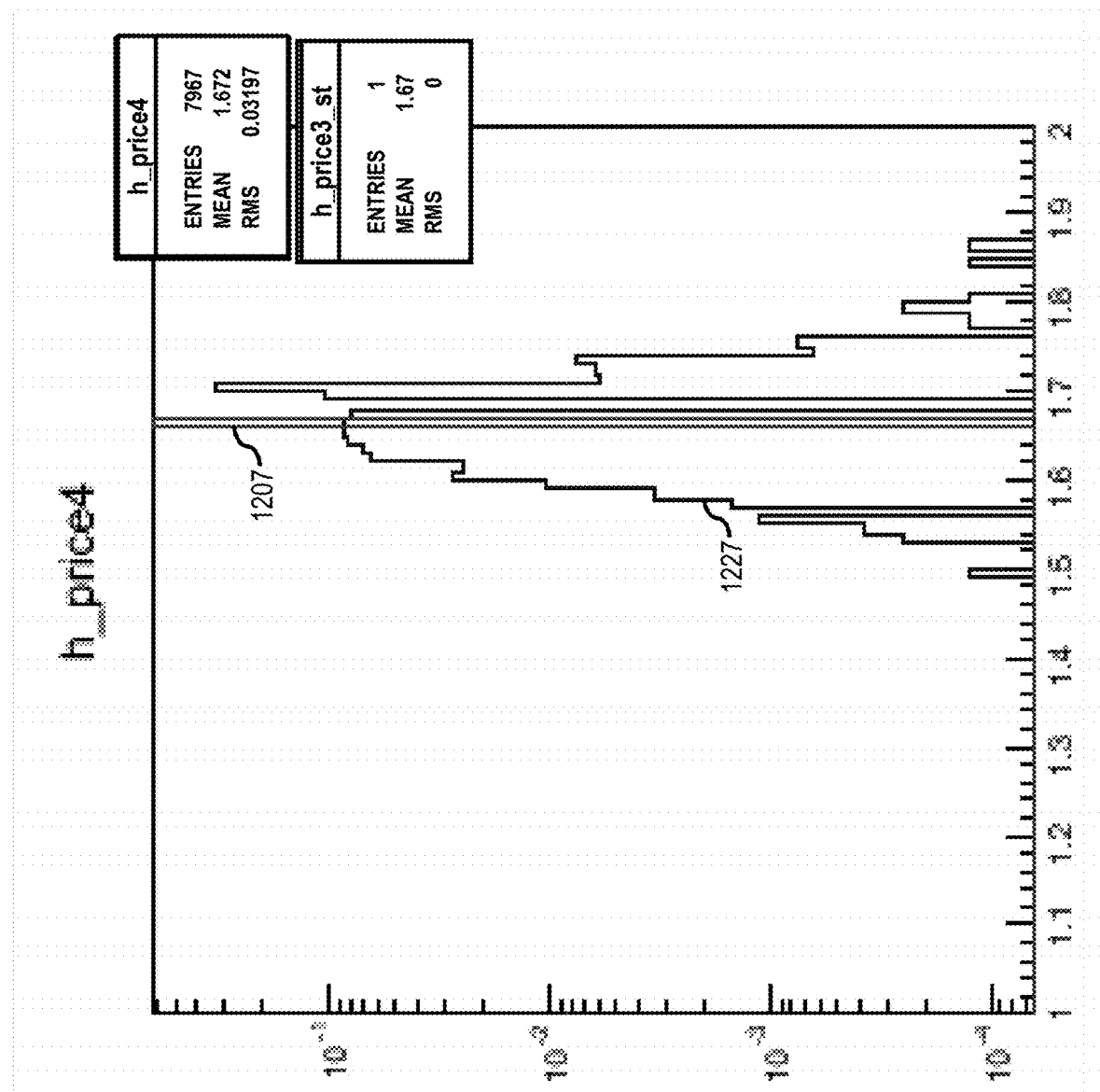
Figure 12:
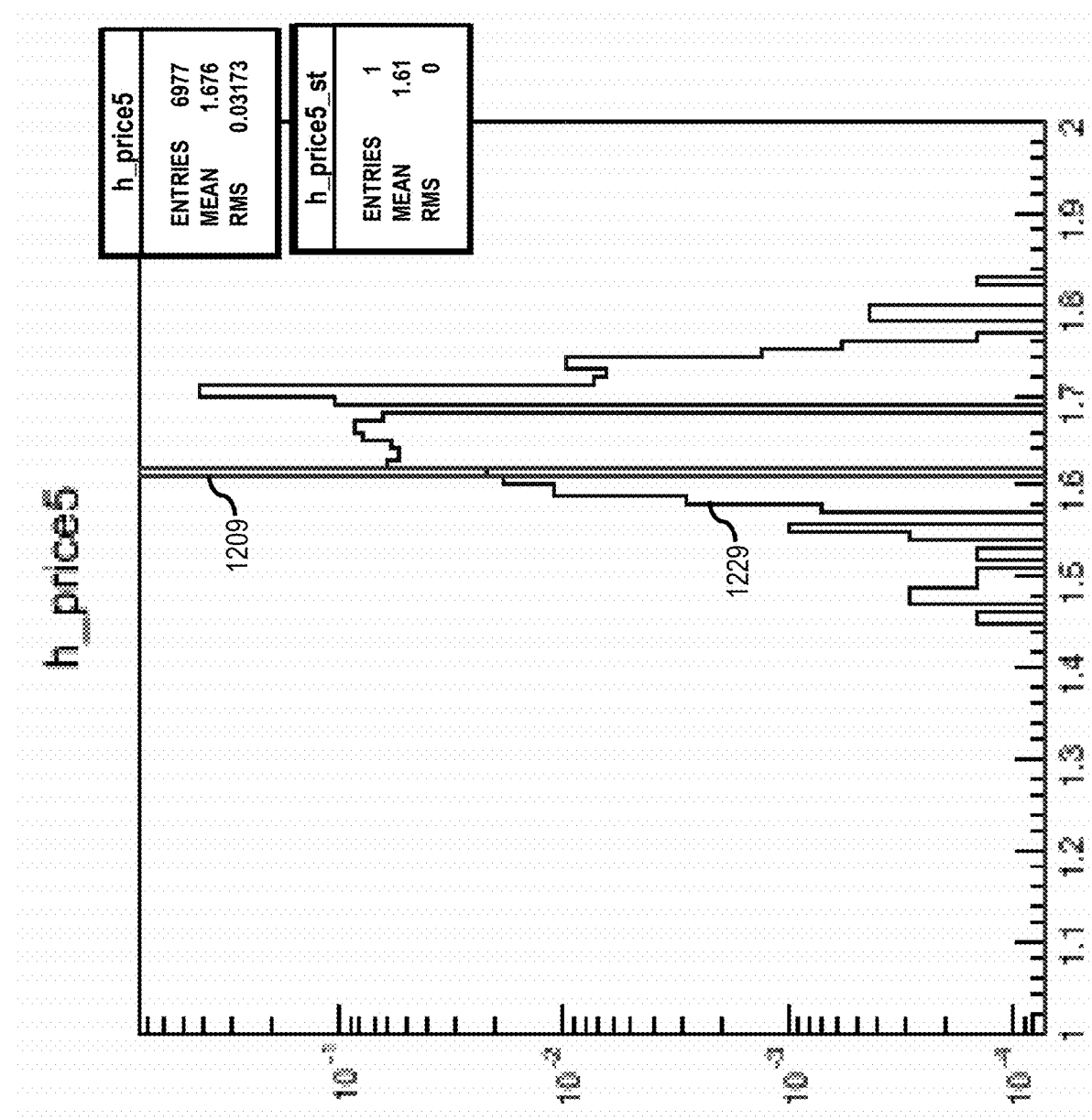
Figure 12:
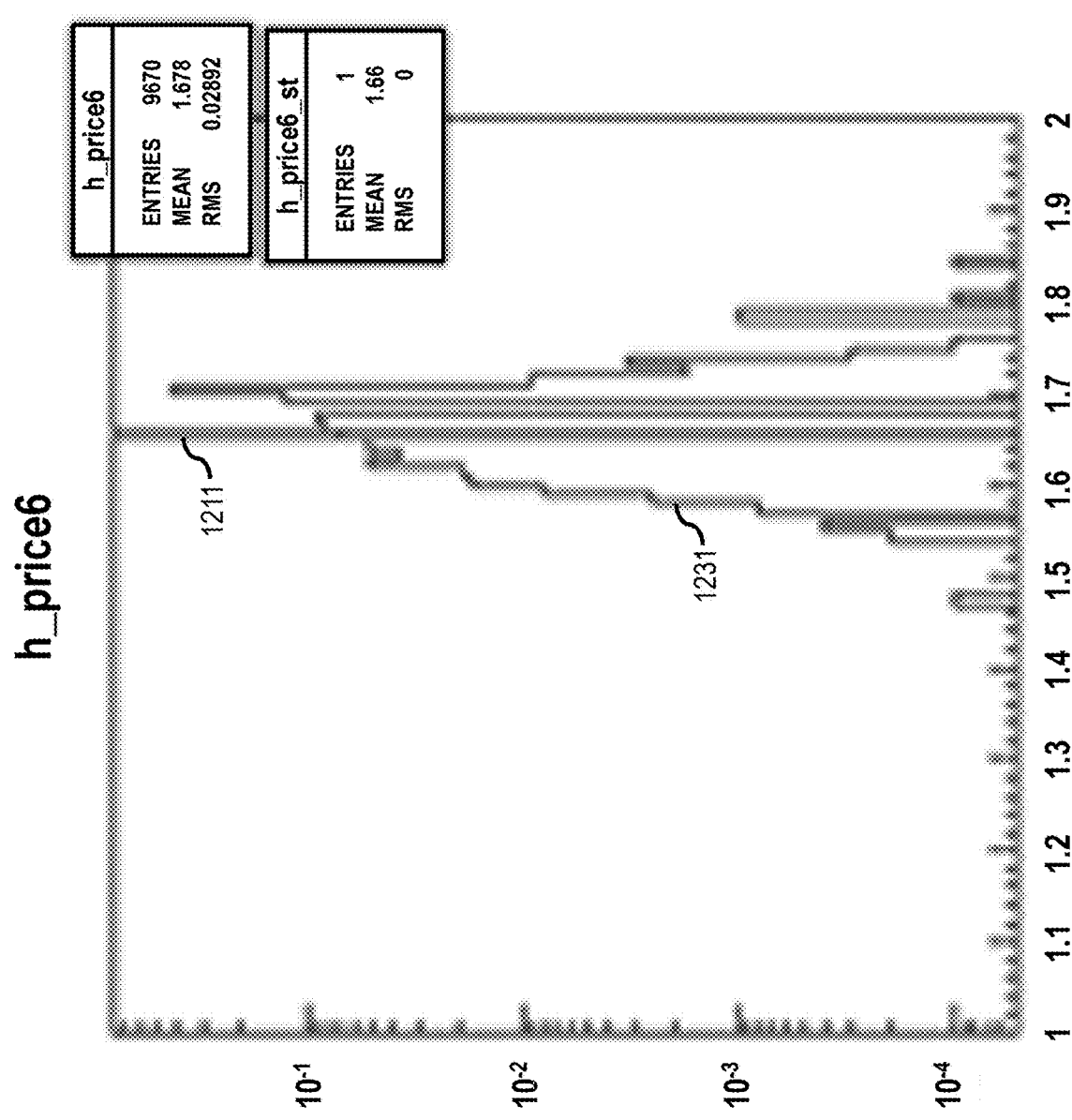
Figure 12:
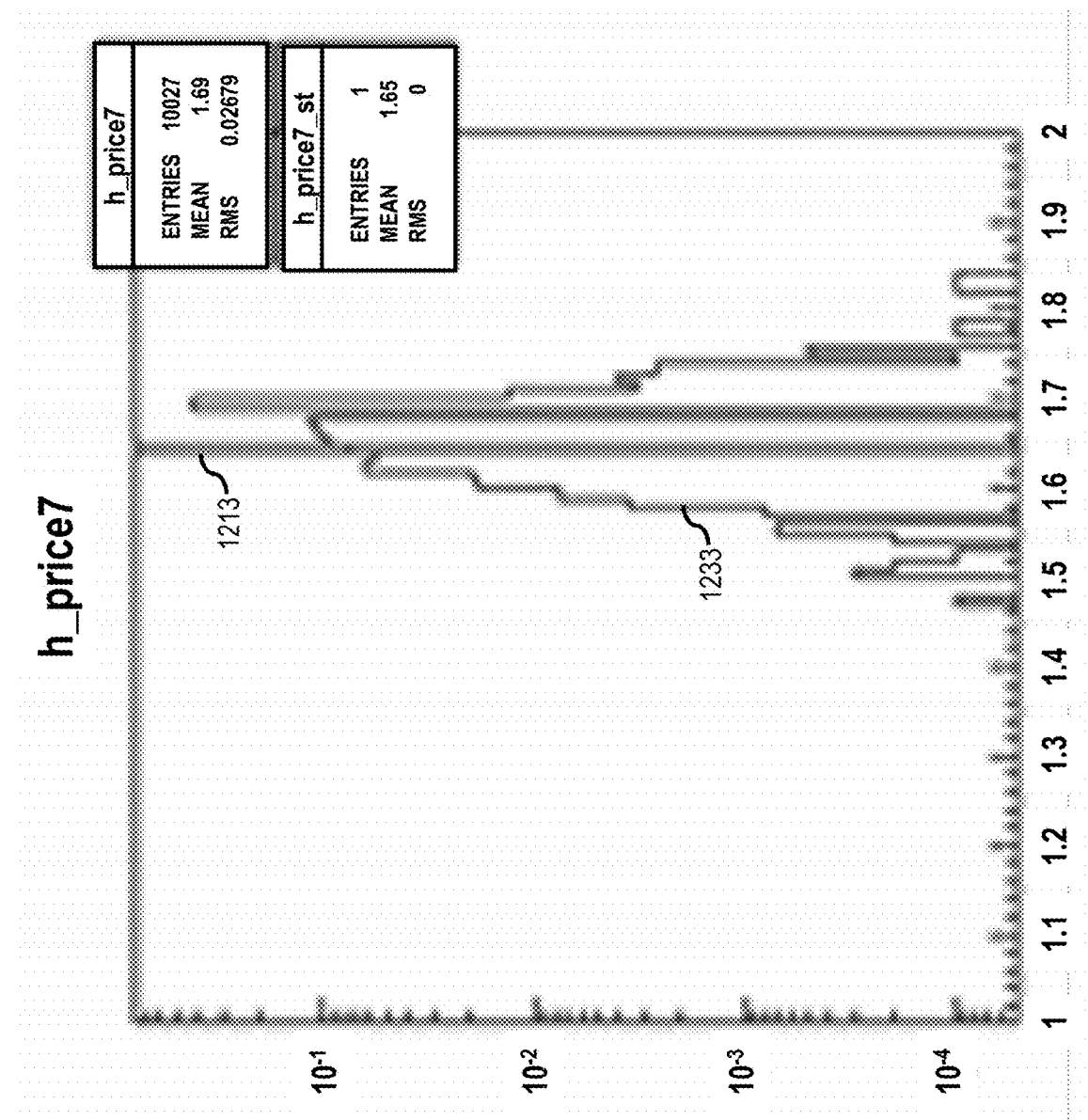
Figure 12:
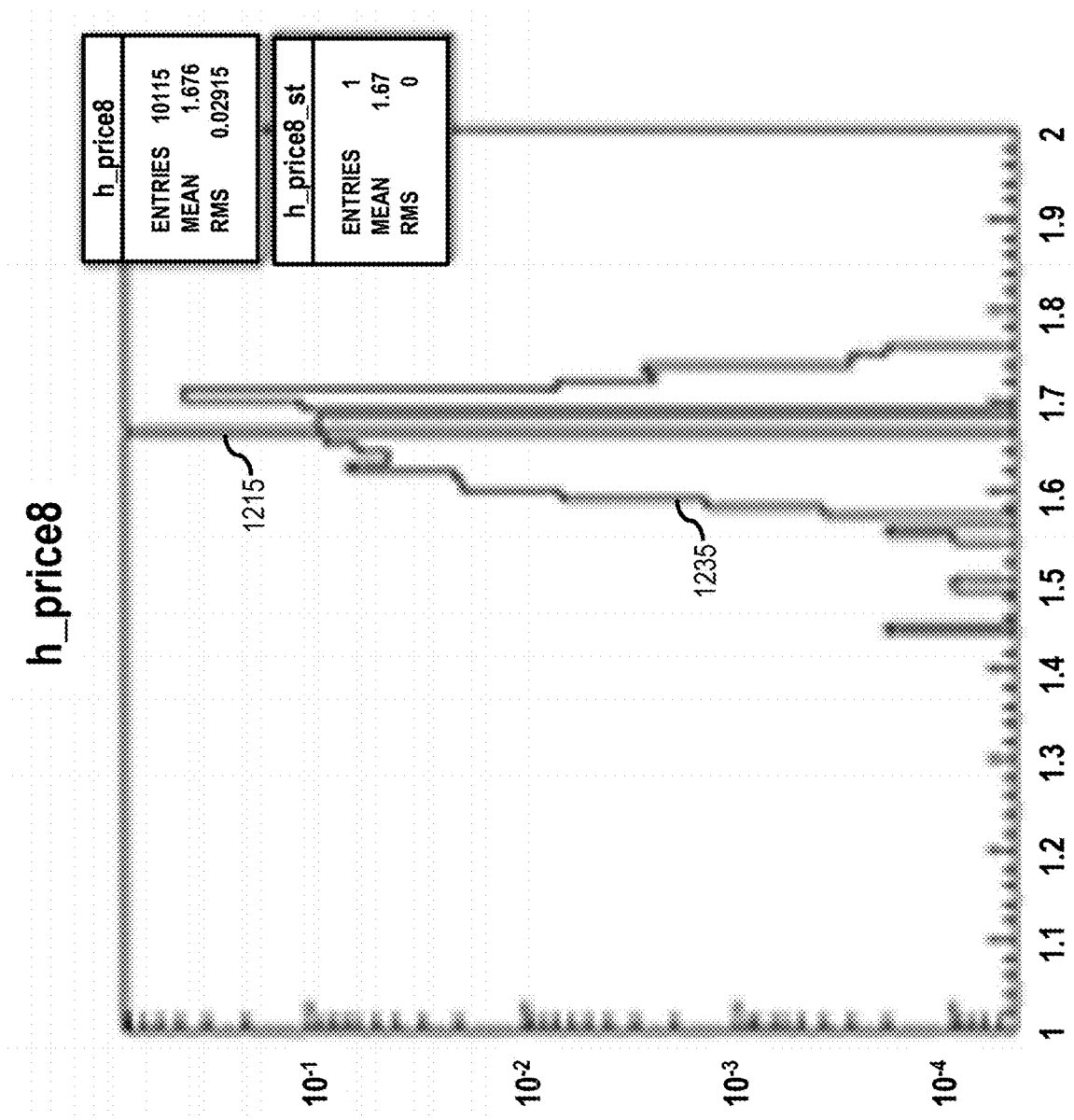
Figure 12:
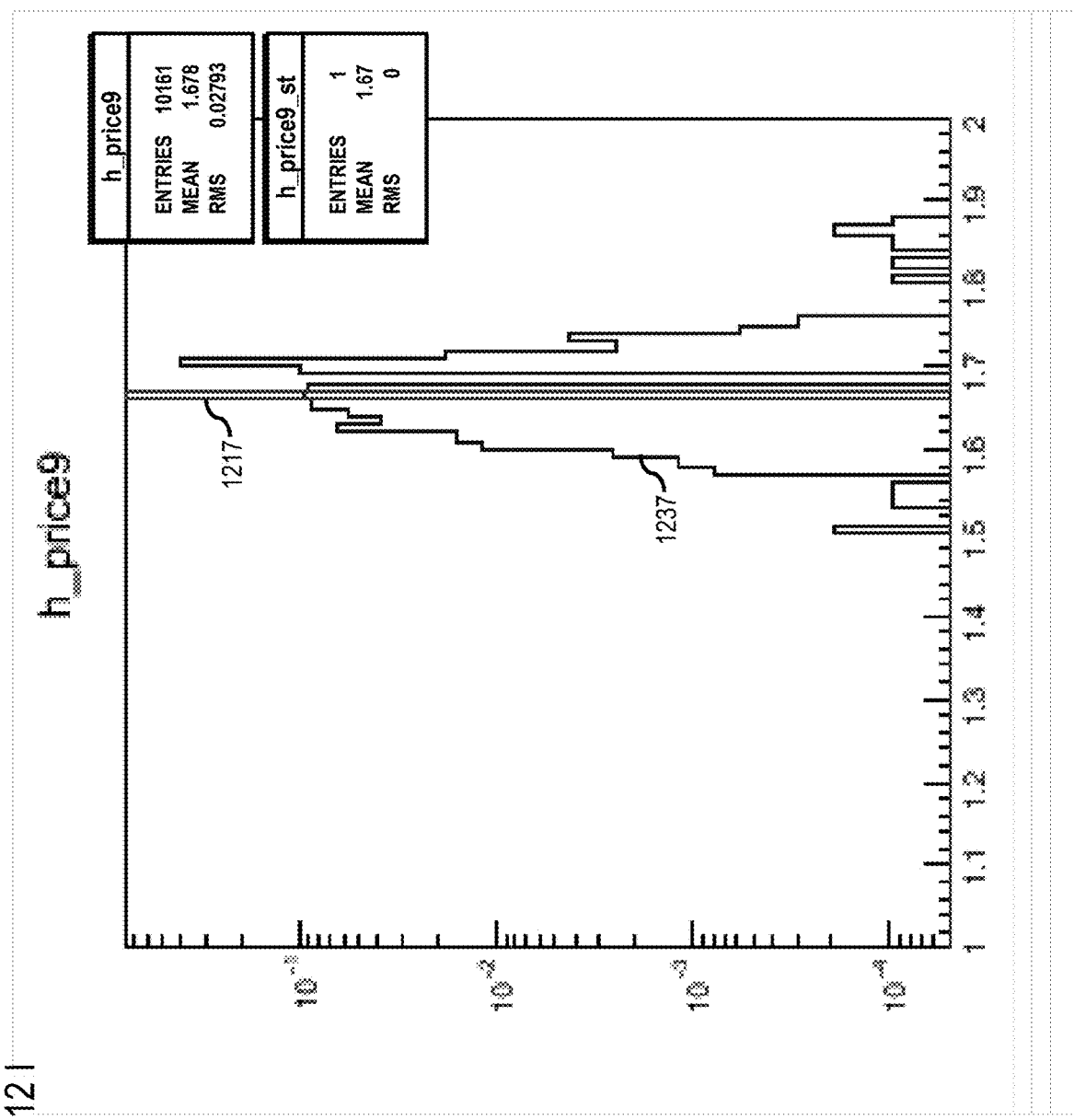
Figure 12:
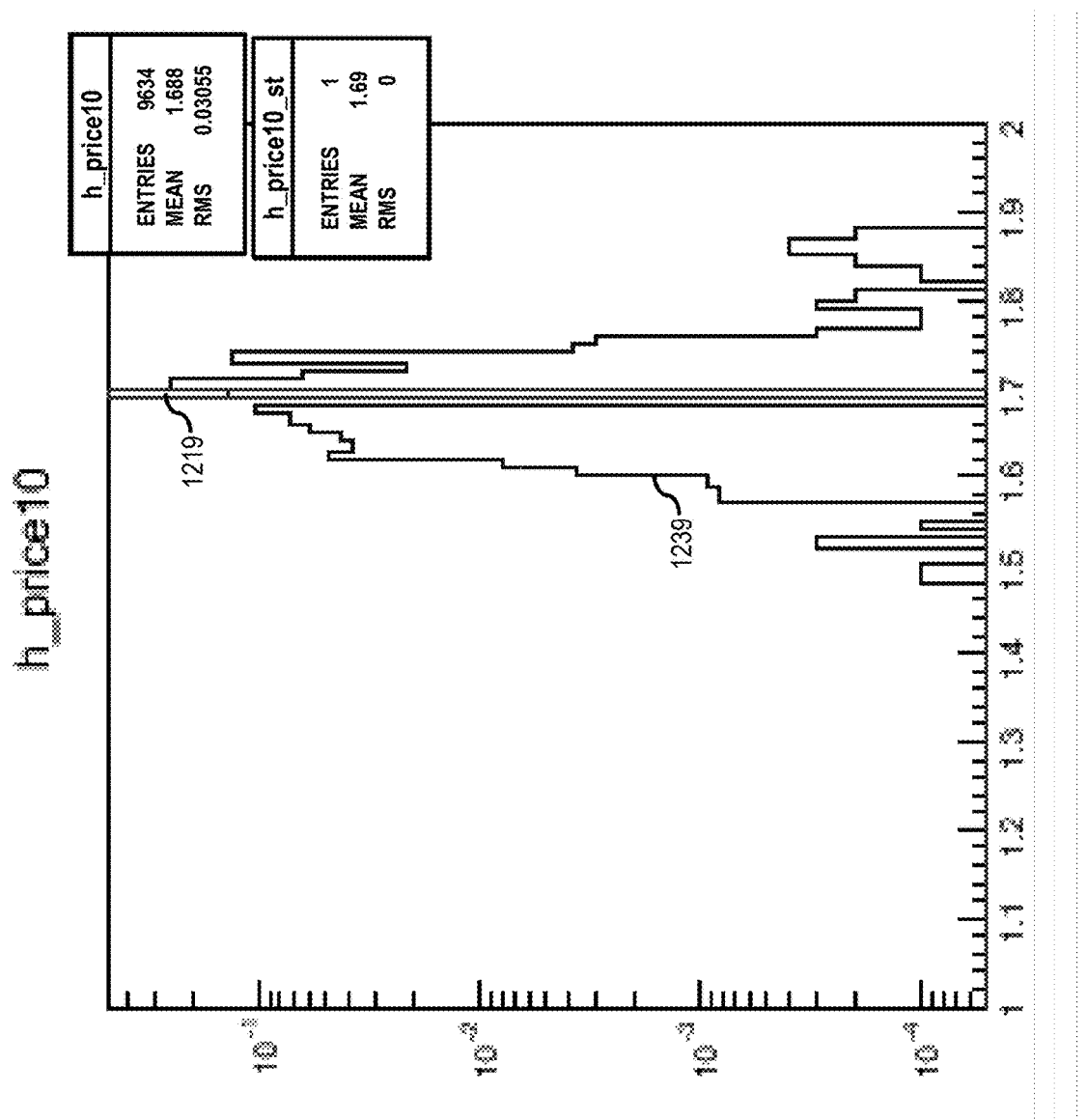

FIG. 10 is a diagram that represents a city based level modelling, according to one example embodiment. In one scenario, the recommendation platform 109 may rank the one or more fuel stations in a local level [1001, 1003], for example, fuel stations relatively in the same area. In another scenario, the recommendation platform 109 may determine an optimal distance for a local geographic range, for example, the recommendation platform 109 may determine the local geographic range to be 10 km, whereby fuel price data for fuel stations within 10 km range may be provided to the at least one querying user. In a further scenario, the recommendation platform 109 may determine Gas Price Index (GPI), wherein the recommendation platform 109 may determine average GPI for a city on a daily basis [1005, 1007, 1009, 1111, 1113]. The recommendation platform 109 may not offer GPI in countries with no gas prices volatility, for example, if there is no price volatility in a given market GPI may not be offered. On the other hand, for all the countries where GPI is offered, the recommendation platform 109 may maintain historical prices for at least six months in each country, which may be refreshed every quarter. In one example embodiment, the recommendation platform 109 may consider real time price from fuel card providers (mainly Diesel type) in each country, real time fuel prices from local sources in some countries, and static and/or real time fuel prices from governmental database sources in some countries, to refresh GPI.

FIG. 11 is a diagram that represents one or more features of the recommendation platform 109, according to one example embodiment. In one embodiment, the recommendation platform 109 may determine fuel content for at least one fuel station [1101]. The recommendation platform 109 may determine an average GPI for a city [1103], wherein the recommendation platform 109 may cause a percentile rank at the city level over the last <X> weeks. The recommendation platform 109 may measure GPI variance for a city [1105], wherein the recommendation platform 109 may measure variation of the city GPI index over the last <X> weeks. The recommendation platform 109 may measure an average country GPI [1107], wherein the recommendation platform 109 may cause a percentile rank at the country level over the last <X> weeks. The recommendation platform 109 may measure a country GPI variance [1109], wherein the recommendation platform 109 may measure variation of the country GPI index over the last <X> weeks. The recommendation platform 109 may measure an average Continental GPI [1111], wherein the recommendation platform 109 may measure a percentile rank at the continent level over the last <X> weeks. The recommendation platform 109 may measure a continental GPI variance [1113], wherein the recommendation platform 109 may measure variation of the continental GPI index over the last <X> weeks. The recommendation platform 109 may also determine price information per type [1115] and rich content static information [1117], for example, alternate type of fuel, amenities, opening hours, etc. In another embodiment, the recommendation platform 109 may determine fuel services API's for at least one fuel station [1119]. The recommendation platform 109 may cause a standard fuel search [1121] based, at least in part, on the fuel types, the relevance in terms of distance and price, other detailed information, or a combination thereof. The recommendation platform 109 may cause a fuel on a trip search [1123], wherein the search may be filtered in terms of fuel type, price, location information, additional detailed information, or a combination thereof. The recommendation platform 109 may find a preferred fuel station based, at least in part, on fuel type, reference POIs set by users, price, additional detailed information, or a combination thereof. In one scenario, the recommendation platform 109 provides fuel stations with relevant information, thereby preventing at least one user from making a wring decision based on old data. In another scenario, the recommendation platform 109 may provide useful insight, for example, daily variations, thus preventing one or more users from accessing old real time data which may be misleading and less directionally accurate. In a further scenario, the recommendation platform 109 may provide at least one user with long term decision making facilities, for example, the recommendation platform 109 may compile data for six months or more, whereby the at least one user may identify at least one fuel station to visit in near future, and need not consult the at least one UE 101 every time. The recommendation platform 109 may also provide at least one user with price information on liquefied petroleum gas (LPG) and compressed natural gas (CNG) based, at least in part, on the location information.

FIGS. 12A-12J are diagrams of the fuel price distribution and the Z-value computation, according example embodiments. The FIGS. 12A-12J are graphs of the distribution of the fuel prices for at least one fuel station with the identification number as '46a1e46-b180-102d-a695-00304891a58c' plotted for the first ten consecutive days. The price of the fuel at the selected station is denoted by 1201, 1203, 1205, 1207, 1209, 1211, 1213, 1215, 1217 and 1219, whereas the distribution of prices in the selected region is represented by 1221, 1223, 1225, 1227, 1229,1231, 1233, 1235, 1237 and 1239. The x-axis represents the fuel price.

FIG. 13 is a diagram that represents a scenario wherein Z-values are computed for different fuel stations, according to one example embodiment. In one scenario, the recommendation platform 109 may compute Z-values for five different fuel stations [1301, 1303, 1305, 1307, 1309]. The first column [1301] is for the candidate fuel station used to generate the histogram plots explained above. The recommendation platform 109 may use the Z values [1241], the mean [1243], and the root mean square (RMS) [1245] from the histogram figures for each day [1311, 1313, 1315, 1317, 1319, 1321, 1323, 1325, 1327, 1329]. The recommendation platform 109 may compute the fuel price estimation, and may determine the fuel price estimation to be precise, upon which the recommendation platform 109 may use the data in the event one or more fuel stations do not submit their fuel prices to the recommendation platform 109 on time. These estimates are then archived in the cloud database 111 and then used for FPI computations. In one scenario, if the Z value in the calculation was unstable for some of the POIs, it can be attributed to the fact that the Z-Values was computed using the global set covering different countries. Computing Z-Values using nearest stations will create more consistent results.

Figure 14:
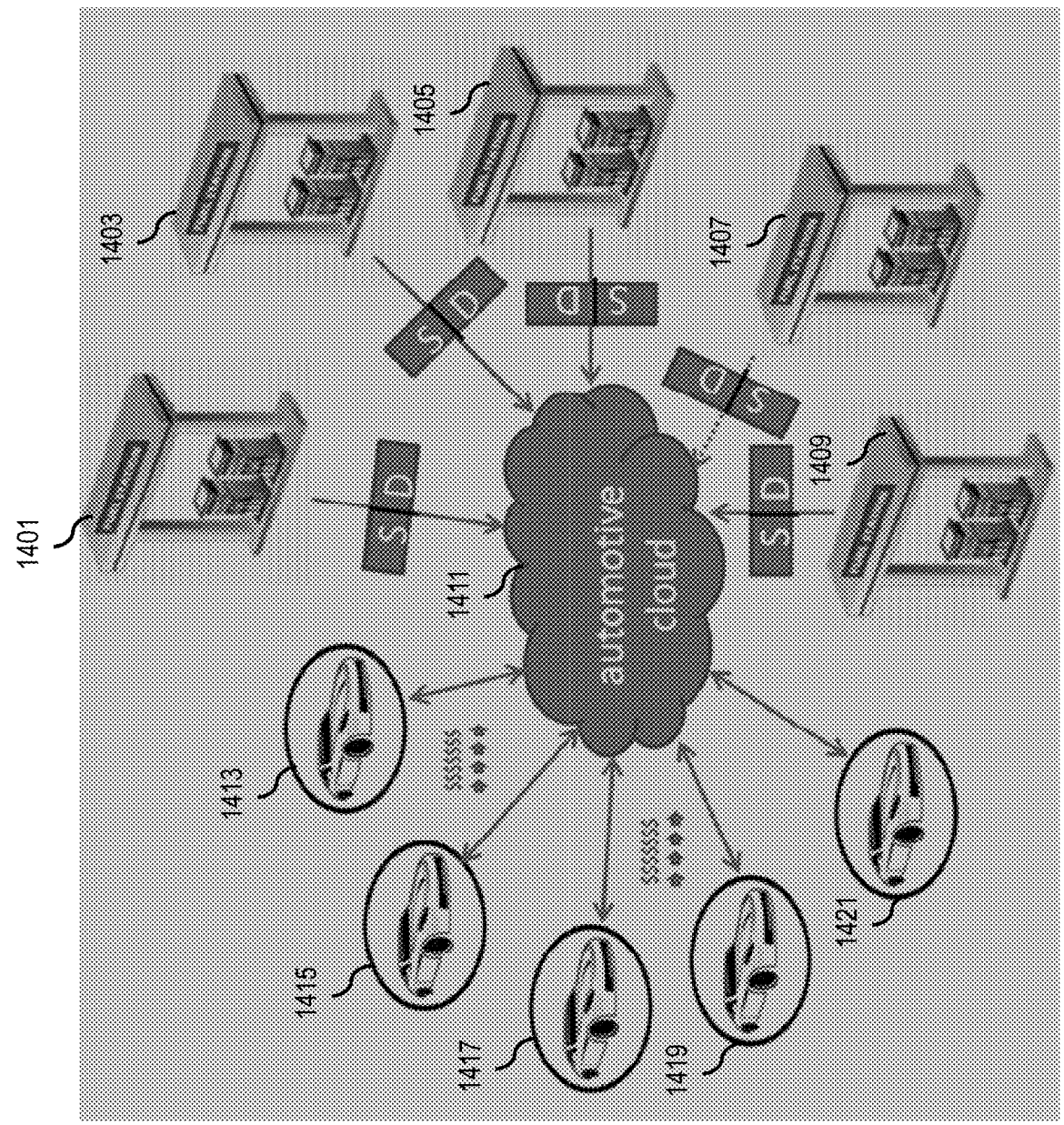
FIG. 14 is a diagram that represents a scenario wherein one or more fuel stations submits their content information to the automotive cloud, according to one example embodiment.

FIG. 14 is a diagram that represents a scenario wherein one or more fuel stations submit their content information to the automotive cloud, according to one example embodiment. In one scenario, one or more fuel stations [1401, 1403, 1405, 1407, 1409] may submit their static content (e.g. location information and address) and dynamic content (e.g. gas price information and queue length information) periodically to the automotive cloud [1411]. In one scenario, the static content may be validated on itself, for example, the location information may validate the address using reverse geocoding while the address may validate the location using geocoding. The static content is transmitted less frequently than the dynamic content, for example, dynamic content such as fuel prices may be submitted once per day while queue length information may be submitted at a higher frequency. In another scenario, the one or more petrol stations may not provide timely information on the dynamic content. Consequently, the recommendation platform 109 provides schemes that estimate one or more dynamic contents, for example, missing fuel prices, missing queue length etc. In a further scenario, the one or more vehicles [1413, 1415, 1417, 1419, 1421] are also connected to the automotive cloud [1411] and may submit their map matched locations to the automotive cloud [1411] as they travel. After the location submissions by the one or more vehicles, the recommendation platform 109 may cause a map matching to address the inaccuracies of the GPS signal. Subsequently, the recommendation platform 109 may calculate FPI for the at least one vehicle and the at least one fuel station based, at least in part, on the submission of the range or a spatial query from the one or more vehicles, and the current dynamic content estimations or actual values.

FIG. 15 is a diagram that represents a fuel station recommendation sent to the at least one navigation system, according to one example embodiment. In one scenario, the dollar signs (i.e. $) [1501, 1503] indicates the price recommendation, wherein lesser number of dollar signs may represent a lower index. On the other hand, less number of arrows [1501, 1503] may represent shorter queues. In such manner, other dynamic content measures and the dollar sign schemes may be one of the possible ways to interpret the data. Such representation may be reported on a per fuel station level or at a lower level of granularity, for example, per fuel station and per fuel type level.

The processes described herein for determining missing dynamic content for at least one target POI by processing plurality of current values for at least one dynamic content parameter associated with a plurality of POIs may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 16:
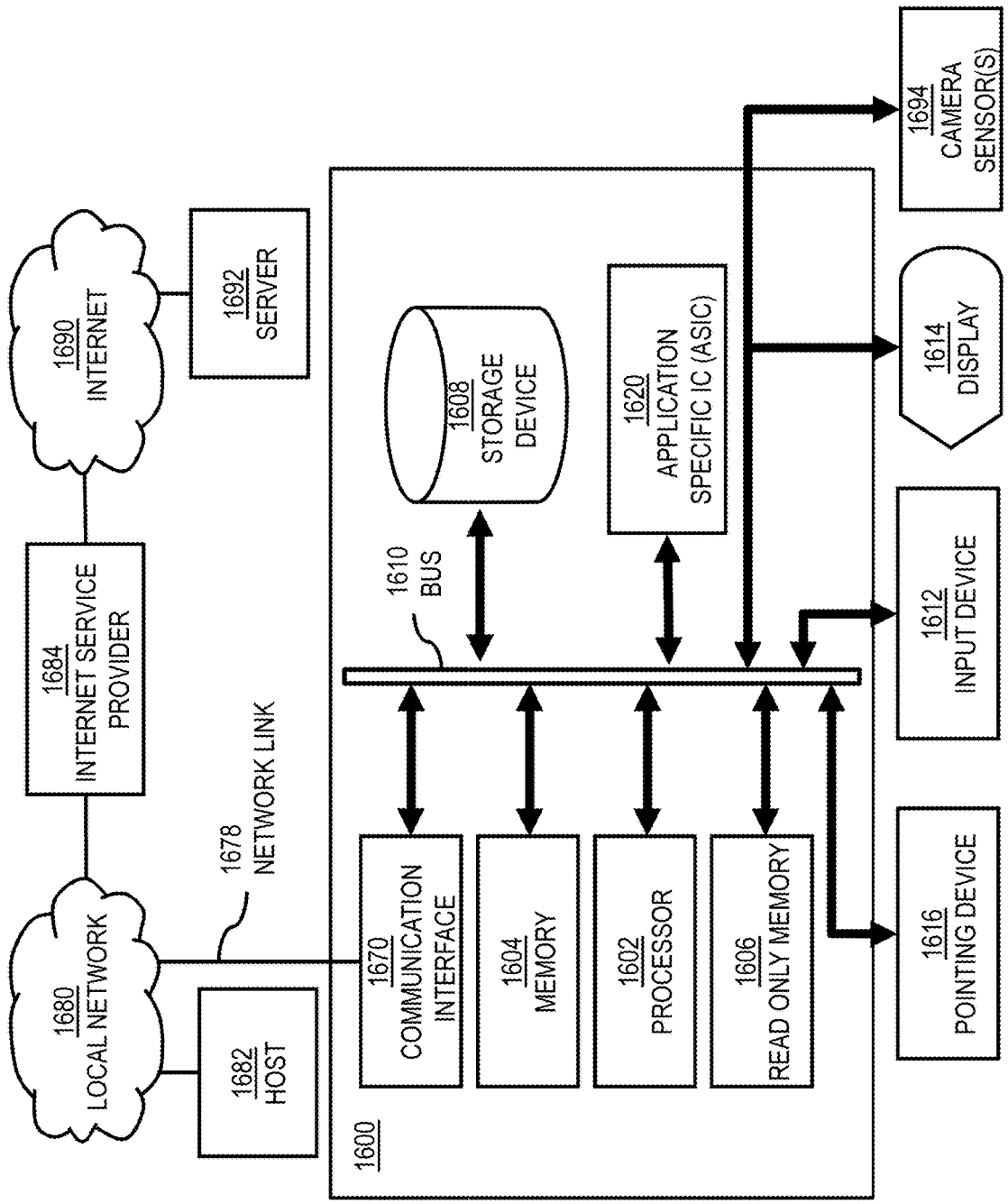
FIG. 16 is a diagram of hardware that can be used to implement an embodiment of the invention.

FIG. 16 illustrates a computer system 1600 upon which an embodiment of the invention may be implemented. Although computer system 1600 is depicted with respect to a particular device or equipment, it is contemplated that other devices or equipment (e.g., network elements, servers, etc.) within FIG. 16 can deploy the illustrated hardware and components of system 1600. Computer system 1600 is programmed (e.g., via computer program code or instructions) to determining missing dynamic content for at least one target POI by processing plurality of current values for at least one dynamic content parameter associated with a plurality of POIs as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1600, or a portion thereof, constitutes a means for performing one or more steps of determining missing dynamic content for at least one target POI by processing plurality of current values for at least one dynamic content parameter associated with a plurality of POIs.

A bus 1610 includes one or more parallel conductors of information so that information is transferred quickly among devices coupled to the bus 1610. One or more processors 1602 for processing information are coupled with the bus 1610.

A processor (or multiple processors) 1602 performs a set of operations on information as specified by computer program code related to determining missing dynamic content for at least one target POI by processing plurality of current values for at least one dynamic content parameter associated with a plurality of POIs. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1600 also includes a memory 1604 coupled to bus 1610. The memory 1604, such as a random access memory (RAM) or any other dynamic storage device, stores information including processor instructions for determining missing dynamic content for at least one target POI by processing plurality of current values for at least one dynamic content parameter associated with a plurality of POIs. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or any other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for determining missing dynamic content for at least one target POI by processing plurality of current values for at least one dynamic content parameter associated with a plurality of POIs, is provided to the bus 1610 for use by the processor from an external input device 1612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT), a liquid crystal display (LCD), a light emitting diode (LED) display, an organic LED (OLED) display, a plasma screen, or a printer for presenting text or images, and a pointing device 1616, such as a mouse, a trackball, cursor direction keys, or a motion sensor, for controlling a position of a small cursor image presented on the display 1614 and issuing commands associated with graphical elements presented on the display 1614, and one or more camera sensors 1694 for capturing, recording and causing to store one or more still and/or moving images (e.g., videos, movies, etc.) which also may comprise audio recordings. In some embodiments, for example, in embodiments in which the computer system 1600 performs all functions automatically without human input, one or more of external input device 1612, display device 1614 and pointing device 1616 may be omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of ASICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners and external disks. In general the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 107 for determining missing dynamic content for at least one target POI by processing plurality of current values for at least one dynamic content parameter associated with a plurality of POIs to the UE 101.

The term "computer-readable medium" as used herein refers to any medium that participates in providing information to processor 1602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1608. Volatile media include, for example, dynamic memory 1604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1620.

Network link 1678 typically provides information communication using transmission media through one or more networks to other devices that use or process the information. For example, network link 1678 may provide a connection through local network 1680 to a host computer 1682 or to equipment 1684 operated by an Internet Service Provider (ISP). ISP equipment 1684 in turn provides data communication services through the public, world-wide packet-switching communication network of networks now commonly referred to as the Internet 1690.

A computer called a server host 1692 connected to the Internet hosts a process that provides a service in response to information received over the Internet. For example, server host 1692 hosts a process that provides information representing video data for presentation at display 1614. It is contemplated that the components of system 1600 can be deployed in various configurations within other computer systems, e.g., host 1682 and server 1692.

At least some embodiments of the invention are related to the use of computer system 1600 for implementing some or all of the techniques described herein. According to one embodiment of the invention, those techniques are performed by computer system 1600 in response to processor 1602 executing one or more sequences of one or more processor instructions contained in memory 1604. Such instructions, also called computer instructions, software and program code, may be read into memory 1604 from another computer-readable medium such as storage device 1608 or network link 1678. Execution of the sequences of instructions contained in memory 1604 causes processor 1602 to perform one or more of the method steps described herein. In alternative embodiments, hardware, such as ASIC 1620, may be used in place of or in combination with software to implement the invention. Thus, embodiments of the invention are not limited to any specific combination of hardware and software, unless otherwise explicitly stated herein.

The signals transmitted over network link 1678 and other networks through communications interface 1670, carry information to and from computer system 1600. Computer system 1600 can send and receive information, including program code, through the networks 1680, 1690 among others, through network link 1678 and communications interface 1670. In an example using the Internet 1690, a server host 1692 transmits program code for a particular application, requested by a message sent from computer 1600, through Internet 1690, ISP equipment 1684, local network 1680 and communications interface 1670. The received code may be executed by processor 1602 as it is received, or may be stored in memory 1604 or in storage device 1608 or any other non-volatile storage for later execution, or both. In this manner, computer system 1600 may obtain application program code in the form of signals on a carrier wave.

Various forms of computer readable media may be involved in carrying one or more sequence of instructions or data or both to processor 1602 for execution. For example, instructions and data may initially be carried on a magnetic disk of a remote computer such as host 1682. The remote computer loads the instructions and data into its dynamic memory and sends the instructions and data over a telephone line using a modem. A modem local to the computer system 1600 receives the instructions and data on a telephone line and uses an infra-red transmitter to convert the instructions and data to a signal on an infra-red carrier wave serving as the network link 1678. An infrared detector serving as communications interface 1670 receives the instructions and data carried in the infrared signal and places information representing the instructions and data onto bus 1610. Bus 1610 carries the information to memory 1604 from which processor 1602 retrieves and executes the instructions using some of the data sent with the instructions. The instructions and data received in memory 1604 may optionally be stored on storage device 1608, either before or after execution by the processor 1602.

FIG. 17 illustrates a chip set or chip 1700 upon which an embodiment of the invention may be implemented. Chip set 1700 is programmed to determine missing dynamic content for at least one target POI by processing plurality of current values for at least one dynamic content parameter associated with a plurality of POIs as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1700 can be implemented in a single chip. It is further contemplated that in certain embodiments the chip set or chip 1700 can be implemented as a single "system on a chip." It is further contemplated that in certain embodiments a separate ASIC would not be used, for example, and that all relevant functions as disclosed herein would be performed by a processor or processors. Chip set or chip 1700, or a portion thereof, constitutes a means for performing one or more steps of providing user interface navigation information associated with the availability of functions. Chip set or chip 1700, or a portion thereof, constitutes a means for performing one or more steps of determining missing dynamic content for at least one target POI by processing plurality of current values for at least one dynamic content parameter associated with a plurality of POIs.

In one embodiment, the chip set or chip 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1700 includes merely one or more processors and some software and/or firmware supporting and/or relating to and/or for the one or more processors.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to determine missing dynamic content for at least one target POI by processing plurality of current values for at least one dynamic content parameter associated with a plurality of POIs. The memory 1705 also stores the data associated with or generated by the execution of the inventive steps.

Figure 18:
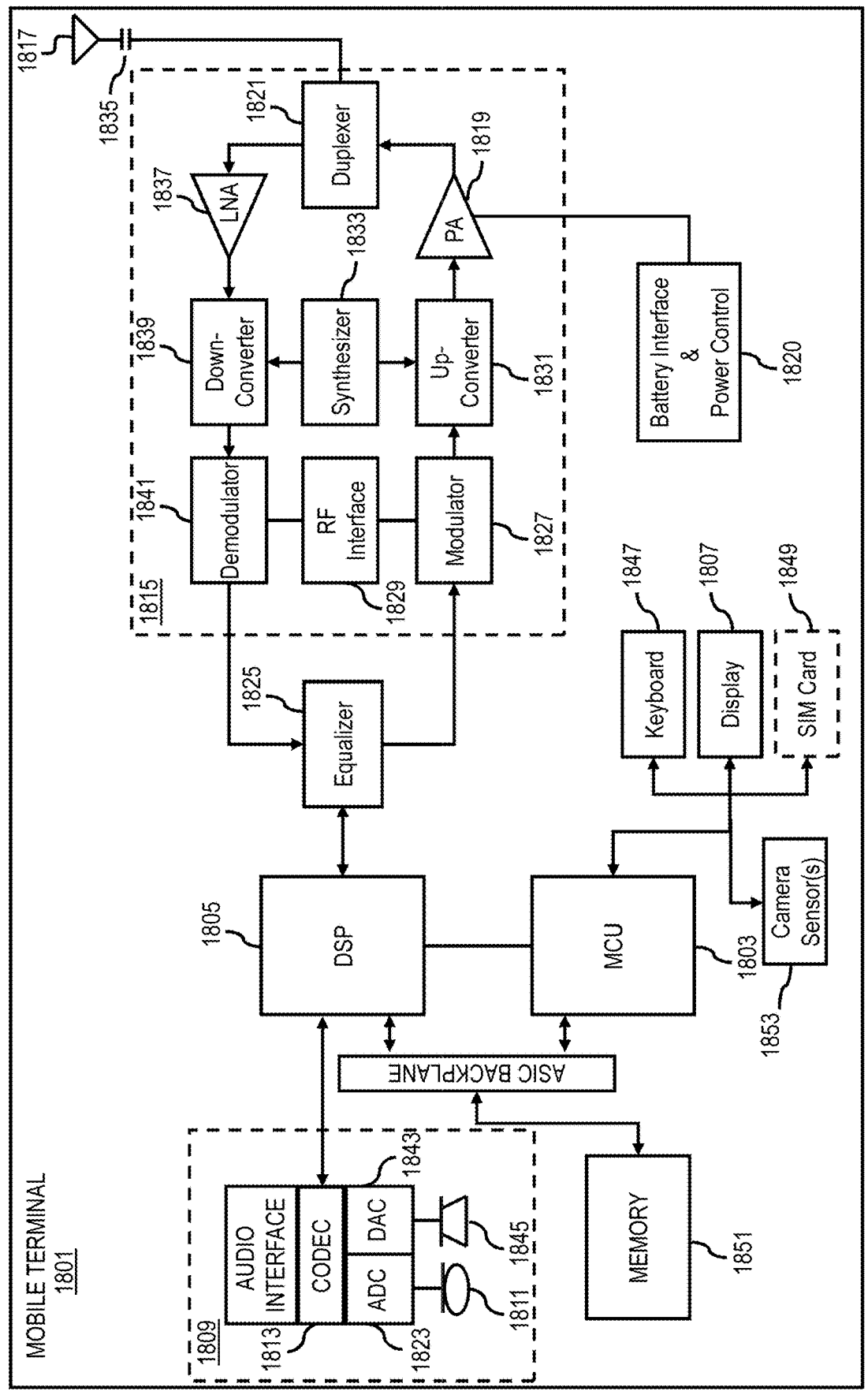
FIG. 18 is a diagram of a mobile terminal (e.g., handset) that can be used to implement an embodiment of the invention.

FIG. 18 is a diagram of exemplary components of a mobile terminal (e.g., handset) for communications, which is capable of operating in the system of FIG. 1, according to one embodiment. In some embodiments, mobile terminal 1801, or a portion thereof, constitutes a means for performing one or more steps of determining missing dynamic content for at least one target POI by processing plurality of current values for at least one dynamic content parameter associated with a plurality of POIs. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile terminal functions that perform or support the steps of determining missing dynamic content for at least one target POI by processing plurality of current values for at least one dynamic content parameter associated with a plurality of POIs. The display 1807 includes display circuitry configured to display at least a portion of a user interface of the mobile terminal (e.g., mobile telephone). Additionally, the display 1807 and display circuitry are configured to facilitate user control of at least some functions of the mobile terminal. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile terminal 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803 which can be implemented as a Central Processing Unit (CPU).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile terminal 1801 to determine missing dynamic content for at least one target POI by processing plurality of current values for at least one dynamic content parameter associated with a plurality of POIs. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the terminal. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile terminal 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable storage medium known in the art. The memory device 1851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1849 carries, for instance, important information, such as the cellular phone number, the carrier supplying service, subscription details, and security information. The SIM card 1849 serves primarily to identify the mobile terminal 1801 on a radio network. The card 1849 also contains a memory for storing a personal telephone number registry, text messages, and user specific mobile terminal settings.

Further, one or more camera sensors 1853 may be incorporated onto the mobile station 1801 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for automated ranking of points of interest when missing price information, comprising:

in response to a spatial query sent from a vehicle for at least one type of points of interest, initiating, by a processor, a map matching to determine one or more location inaccuracies of global positioning system data received from the vehicle, wherein the spatial query is sent from the vehicle upon a detected fuel level without user intervention, and wherein the global positioning system data is collected by one or more sensors mounted on the vehicle;

determining in real-time, by the processor, at least one distribution of a plurality of current values for dynamic content parameters associated with a plurality of points of interest of the at least one type and within a predetermined proximity to a route of the vehicle, wherein the points of interest are determined as within the predetermined proximity by addressing the one or more location inaccuracies of the global positioning system data using one or more distance measures, and wherein the dynamic content parameters include a price parameter, a route distance parameter, an available type parameter, and a queue length parameter for obtaining a product or service at a respective point of interest;

determining, by the processor, at least one distribution mean and at least one distribution standard deviation for the at least one distribution of the plurality of current values of the price parameter, the route distance parameter, the available type parameter, and the queue length parameter;

determining, by the processor, at least one set of historical values of the price parameter, for at least one target point of interest that misses at least one actual current value of the price parameter;

determining, by the processor, that historical values of the price parameter, for some of the plurality of points of interest of the at least one type and within a proximity range or level from the at least one target point of interest follow a geographic distribution pattern over time;

calculating, by the processor, an estimated current value of the price parameter for the at least one target point of interest based, at least in part, on the geographic distribution pattern, the at least one set of historical values, the at least one distribution mean, and the at least one distribution standard deviation;

ranking, by the processor, the plurality of points of interest based on the estimated current value of the price parameter of the at least one target point of interest and actual current values of the price parameter of other ones of the plurality of points of interest; and in response to a destination selected based on the ranking, causing, at least in part by the processor, aligning the vehicle with a geometry of a road and navigating the vehicle to the destination, wherein the some of the plurality of points of interest on a top of the price ranking are presented with the geographic distribution pattern at the proximity range or level on a user interface for the vehicle without user intervention.

2. A method of claim 1, wherein the product or service includes fuel, the at least one type of points of interest is fuel station, the available type parameter is an available fuel type parameter, and the user interface is rendered via a navigation application, and the method further comprising:

determining at least one set of historical values of the available fuel type parameter, for at least one target point of interest that misses at least one actual current value of the available fuel type parameter;

calculating an estimated current value of the available fuel type parameter for the at least one target point of interest based, at least in part, on the at least one set of historical values, the at least one distribution mean, and the at least one distribution standard deviation; and ranking the plurality of points of interest based on the estimated current value of the available fuel type parameter of the at least one target point of interest and actual current values of the available fuel type parameter of other ones of the plurality of points of interest, wherein some of the plurality of points of interest on a top of the available fuel type ranking are presented on a user interface for the vehicle without user intervention, and wherein the one or more location inaccuracies of global positioning system data are determined by comparing an address of the at least one target point of interest with an address based on reverse geocoding of the global positioning system data received from the vehicle to obtain the one or more distance measures.

3. A method of claim 1, wherein the user interface further presents a name, a location, an address, or a combination thereof, of the at least one target point of interest.

4. A method of claim 1, wherein the at least one set of historical values represents one or more known values for the at least one dynamic parameter collected from the at least one target point of interest over a predetermined prior time period, and wherein the one or more location inaccuracies of global positioning system data received from the vehicle are determined by comparing geographic coordinates based on forward geocoding of an address of the at least one target point of interest with geographic coordinates in the global positioning system data received from the vehicle to obtain the one or more distance measures.

5. A method of claim 1, further comprising:

determining at least one confidence range for the at least one estimated current value based, at least in part, on a comparison of at least one estimated historical value against at least one actual historical value associated with the at least one target point of interest, wherein the proximity range or level is a local, city, or national level including a location of the at least one target point of interest.

6. A method of claim 1, further comprising:

determining the plurality of points of interest, the at least one target point of interest, or a combination thereof based, at least in part, on at least one spatial query, wherein the proximity range or level is defined by a distance from a location of the at least one target point of interest.

7. A method of claim 1, further comprising:

calculating one or more price indices, percentile ranking information, one or more differences from at least one base value, or a combination thereof based, at least in part, on the at least one estimated current value of the price parameter.

8. A method of claim 7, further comprising:

encoding the one or more value indices, the percentile ranking information, the one or more differences from at least one base value, or a combination thereof according to at least one visualization scheme, wherein the user interface further presents the one or more value indices, the percentile ranking information, the one or more differences, or a combination thereof according to the at least one visualization scheme on the user interface, in conjunction with one or more actual current values of the route distance parameter and the queue length parameter of the plurality of points of interest.

9. A method of claim 1, further comprising:

determining that a number of the plurality of current values, the at least one set of historical values, or a combination thereof is below a predetermined threshold value; and returning a no value for the at least one estimated current value based, at least in part, on the determination.

10. A method of claim 1, further comprising:

determining at least one set of historical values for the queue length parameter, for the at least one target point of interest that misses at least one actual current value of the queue length parameter;

calculating an estimated current value of the queue length parameter for the at least one target point of interest based, at least in part, on the at least one set of historical values, the at least one distribution mean, and the at least one distribution standard deviation;

re-ranking the plurality of points of interest based on the estimated current value of the queue length parameter of the at least one target point of interest and actual current values of the queue length parameter of the other points of interest; and initiating a graphic presentation of the price ranking and the queue length ranking per point of interest for some of the plurality of points of interest on the user interface, wherein the plurality of current values represent one or more current values collected at a current time, within a predetermined time window prior to the current time, or a combination thereof.

11. An apparatus for automated ranking of points of interest when missing price information, comprising:
at least one processor; and
at least one memory including computer program code for one or more programs, the at least one memory and the computer program code configured to, with the at least one processor, cause the apparatus to perform at least the following,
in response to a spatial query sent from a vehicle for at least one type of points of interest, initiate a map matching to determine one or more location inaccuracies of global positioning system data received from the vehicle, wherein the spatial query is sent from the vehicle upon a detected fuel level without user intervention, and wherein the global positioning system data is collected by one or more sensors mounted on the vehicle;
determine in real-time at least one distribution of a plurality of current values for dynamic content parameters associated with a plurality of points of interest of the at least one type and within a predetermined proximity to a route of the vehicle, wherein the points of interest are determined as within the predetermined proximity by addressing the one or more location inaccuracies of the global positioning system data using one or more distance measures, and wherein the dynamic content parameters include a price parameter, a route distance parameter, an available type parameter, and a queue length parameter for obtaining a product or service at a respective point of interest;
determine at least one distribution mean and at least one distribution standard deviation for the at least one distribution of the plurality of current values of the price parameter, the route distance parameter, the available type parameter, and the queue length parameter;
determine at least one set of historical values of the price parameter, for at least one target point of interest that misses at least one actual current value of the price parameter;
determine that historical values of the price parameter, for some of the plurality of points of interest of the at least one type and within a proximity range or level from the at least one target point of interest follow a geographic distribution pattern over time;
calculate an estimated current value of the price parameter for the at least one target point of interest based, at least in part, on the geographic distribution pattern, the at least one set of historical values, the at least one distribution mean, and the at least one distribution standard deviation;
rank the plurality of points of interest based on the estimated current value of the price parameter of the at least one target point of interest and actual current values of the price parameter of other ones of the plurality of points of interest; and in response to a destination selected based on the ranking, cause, at least in part, aligning the vehicle with a geometry of a road and navigating the vehicle to the destination,
wherein the some of the plurality of points of interest on a top of the price ranking are presented with the geographic distribution pattern at the proximity range or level on a user interface for the vehicle without user intervention.

12. An apparatus of claim 11, wherein the product or service includes fuel, the at least one type of points of interest is fuel station, and the user interface is rendered via a navigation application.

13. An apparatus of claim 11, wherein the user interface further presents a name, a location, an address, or a combination thereof, of the at least one target point of interest.

14. An apparatus of claim 11, wherein the at least one set of historical values represents one or more known values for the at least one dynamic parameter collected from the at least one target point of interest over a predetermined prior time period.

15. An apparatus of claim 11, wherein the apparatus is further caused to:
determine at least one confidence range for the at least one estimated current value based, at least in part, on a comparison of at least one estimated historical value against at least one actual historical value associated with the at least one target point of interest.

16. An apparatus of claim 11, wherein the apparatus is further caused to:
determine the plurality of points of interest, the at least one target point of interest, or a combination thereof based, at least in part, on at least one spatial query.

17. A method of claim 7, further comprising:
generating a recommendation of one or more of some of the points of interest based, at least in part, on the one or more value indices, the percentile ranking information, the one or more differences, or a combination thereof,
wherein the user interface further presents the recommendation.

18. A method of claim 7, wherein the one or more value indices indicate relative price levels.

19. A method of claim 7, wherein the one or more value indices are calculated for each of the plurality of points of interest, based on a number of the plurality of points of interest, a number of the plurality of points of interest that have an identical price, and a number of the plurality of points of interest that have a price lower than the identical price.

20. A method of claim 19, wherein the percentile ranking information is calculated for each of the plurality of points of interest, based, at least in part, on the one or more price indices, a number of the plurality of points of interest with pricing lower than a price index of a respective point of interest, a number of the plurality of points of interest with an identical price index, the number of the plurality of points of interest that have a price lower than the identical price index, or a combination thereof.

* * * * *